United States Patent
Shinkai et al.

(10) Patent No.: US 7,680,393 B2
(45) Date of Patent: Mar. 16, 2010

(54) CONTENT EDITING ASSISTANCE SYSTEM, VIDEO PROCESSING APPARATUS, PLAYBACK APPARATUS, EDITING APPARATUS, COMPUTER PROGRAM, AND CONTENT PROCESSING METHOD

(75) Inventors: Mitsutoshi Shinkai, Kanagawa (JP); Yoshiaki Shibata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1165 days.

(21) Appl. No.: 10/706,445

(22) Filed: Nov. 12, 2003

(65) Prior Publication Data

US 2004/0244047 A1 Dec. 2, 2004

(30) Foreign Application Priority Data

Nov. 13, 2002 (JP) ............................. 2002-329949

(51) Int. Cl.
G11B 27/00 (2006.01)
H04N 5/93 (2006.01)

(52) U.S. Cl. ........................... 386/52; 386/55; 725/115; 725/93; 725/145

(58) Field of Classification Search .................. 386/52; 725/115, 93, 145
See application file for complete search history.

(56) References Cited

U.S. PATENT DOCUMENTS 5,930,445 A 7/1999 Peters et al.
6,408,301 B1 6/2002 Patton et al.
2002/0152082 A1* 10/2002 Harradine et al. ........... 704/278

FOREIGN PATENT DOCUMENTS

| EP | 1 083 567 | 3/2001 |
|----|-----------|--------|
| EP | 1 187 472 | 3/2002 |
| JP | 2001-143445 | 5/2001 |
| JP | 2001-285780 | 10/2001 |
| JP | 2001-290731 | 10/2001 |
| JP | 2001-292406 | 10/2001 |
| JP | 2002 247504 | 8/2002 |
| WO | WO 01 75884 | 10/2001 |

OTHER PUBLICATIONS

Kazuaki Tanaka et al: "Intelligent Rough Video Editing System" Hitachi Review, Hitachi LTD. Tokyo, JP, vol. 44, No. 4, Aug. 1, 1995, pp. 217-220 XP000550273 ISSN: 0018-277X.

* cited by examiner

Primary Examiner—Thai Tran
Assistant Examiner—Girumsew Wendmagegn
(74) Attorney, Agent, or Firm—Frommer Lawrence & Haug LLP; William S. Frommer; Thomas F. Presson

(57) ABSTRACT

A content editing assistance system includes a mark generator for generating electronic mark data relating to content data; a take-metadata generator for generating a take-metadata file based on the electronic mark data generated for each take; a manager for managing the content data and the take-metadata file relating to the content data as separate files; a list generator for generating electronic-mark-list data based on the take-metadata file; and an editor for editing the electronic-mark-list data.

32 Claims, 19 Drawing Sheets

FIG. 2

| | |
|---|---|
| _RecStart | POINT WHERE RECORDING STARTED |
| _RecEnd | POINT WHERE RECORDING ENDED |
| _ShotMark1 | ARBITRARY POINT 1 |
| _ShotMark2 | ARBITRARY POINT 2 |
| _Cut | POINT OF CUTTING |
| _Flash | POINT WHERE FLASH WAS DETECTED |
| _FilterChange | POINT WHERE LENS FILTER WAS CHANGED |
| _ShutterSpeedChange | POINT WHERE SHUTTER SPEED WAS CHANGED |
| _GainChange | POINT WHERE GAIN WAS CHANGED |
| _WhiteBalanceChange | POINT WHERE WHITE BALANCE WAS CHANGED |
| _OverBrightness | POINT WHERE VIDEO OUTPUT LEVEL EXCEEDED 100% |
| _OverAudioLimiter | POINT WHERE AUDIO OUTPUT LEVEL EXCEEDED LIMIT VALUE |
| _In-XXX | POINT WHERE EXTRACTION OF MATERIAL STARTED |
| _OUt-XXX | POINT WHERE EXTRACTION OF MATERIAL ENDED |

FIG. 3

| KEY (16 BYTES) | LENGTH (1 BYTE) | VALUE (MAXIMUM 32 BYTES) |
|---|---|---|

FIG. 4

```xml
<?xml version="1.0" encoding="iso-8859-1"?>
<TakeMetadata id="thisTake" no="1" status="OK">
    <Umid>060A2B340101010101010111...</Umid>
    <LastUmid>060A2B340101010101010111...</LastUmid>
    <CreationTime isSummarTime="false">2002-10-01T12:34:56+09:00</CreationTime>
    <LastUpdate isSummarTime="false">2002-10-01T23:45:01+09:00</LastUpdate>
    <Duration>P10M20S15N30F</Duration>
    <Device>
        <Kind>IMX/DV Optical Camcorder</Kind>                    ⎫
        <Model name="ABC-0123" serialNo="12-34-56-78"/>          ⎪
301     <SystemInfo board="AAA board 02/01" software="1.0"/>     ⎬
        <FormatInfo>...</FormatInfo>                             ⎪
        <CameraSetting>...</CameraSetting>                       ⎭
    </Device>
    <ComponentMaterial>
        <Video src="video1.mxf"/>                                ⎫
        <Audio src="audio1.mxf"/>                                ⎪
        <Audio src="audio2.mxf"/>                                ⎪
        <Audio src="audio3.mxf"/>                                ⎪
302     <Audio src="audio4.mxf"/>                                ⎬
        <Aux src="aux1.bin"/>                                    ⎪
        <MxfHeader src="mxfHeader1.bin"/>                        ⎪
        <SystemMetadata src="systemMetadata1.bin"/>              ⎪
        <UserFrameMetadata src="userFrameMetadata1.bin"/>        ⎭
    </ComponentMaterial>
    <Description>This is a first take captureed at my first work</Description>
    <EssenceMarkTable>
        <EssenceMark value="_Flash">02/10/23/09:43:52:01</EssenceMark>           ⎫
        <EssenceMark value="_Flash">02/10/23/09:44:10:20</EssenceMark>           ⎪
        <EssenceMark value="_OverAudioLimiter">02/10/23/09:44:23:25</EssenceMark>⎪
        <EssenceMark value="_Flash">02/10/23/09:45:01:15</EssenceMark>           ⎬ 303
        <EssenceMark value="_OverBrightness">02/10/23/09:47:03:21</EssenceMark>  ⎪
        <EssenceMark value="_Flash">02/10/23/09:47:15:11</EssenceMark>           ⎪
        <EssenceMark value="_In-001">02/10/23/09:43:40:21</EssenceMark>          ⎪
        <EssenceMark value="_Out-001">02/10/23/09:44:15:08</EssenceMark>         ⎭
    </EssenceMarkTable>
</TakeMetadata>
```

FIG. 15

| _Flash | 02/10/23/09:43:52:01 |
|---|---|
| _Flash | 02/10/23/09:44:10:20 |
| _Over Audio Limiter | 02/10/23/09:44:23:25 |
| _Flash | 02/10/23/09:45:01:15 |
| _Over Brightness | 02/10/23/09:47:03:21 |
| _Flash | 02/10/23/09:47:15:11 |

FIG. 19

| _Flash | 02/10/23/09:43:52:01 |
|---|---|
| _Flash | 02/10/23/09:44:10:20 |
| _Over Audio Limiter | 02/10/23/09:44:23:25 |
| _Flash | 02/10/23/09:45:01:15 |
| _Over Brightness | 02/10/23/09:47:03:21 |
| _Flash | 02/10/23/09:47:15:11 |
| _In-001 | 02/10/23/09:43:40:21 |
| _Out-001 | 02/10/23/09:44:15:08 |

CONTENT EDITING ASSISTANCE SYSTEM, VIDEO PROCESSING APPARATUS, PLAYBACK APPARATUS, EDITING APPARATUS, COMPUTER PROGRAM, AND CONTENT PROCESSING METHOD

BACKGROUND OF THE INVENTION

1. Field of the Invention

The present invention generally relates to systems for editing content data. Particularly, the present invention relates to a video-content editing system, a video processing apparatus, an editing apparatus, a computer program, and a content processing method.

2. Description of the Related Art

A program that is broadcasted is produced by editing a plurality of content materials (content data) such as images captured at sites of newsgathering. The editing of content data includes, for example, coarse editing and final editing. In coarse editing, video scenes to be broadcasted are selected from a plurality of pieces of content data and range of the video scenes are defined. In final editing, final content data (perfect package) that is used as a final product is produced based on at least one video scene selected in coarse editing. A video scene refers to a collection of at least one video cut. A video cut refers to content data captured in a take and having an extraction start point (In-point) and an extraction end point (Out-point) specified. A take refers to an imaging process that is continued from a start to an end of a single recording operation.

In coarse editing, in order for logging of video scenes, video cuts that constitute parts of video scenes must be extracted. Thus, first, content data that will be needed is selected from a plurality of pieces of content data.

When content data has been selected, a video cut is extracted by recording an extraction start point (In-point) and an extraction end point (Out-point) of each piece of content data selected, for example, on paper.

When video cuts have been extracted, one or more video cuts extracted from the content data are combined in accordance with video scenes to be used in final editing, whereby a video scene is produced. The art is disclosed, for example, in Japanese Unexamined Patent Application Publication No. 2001-290731.

As described above, in the process of coarse editing of content data captured, video cuts suitable for video scenes needed in final editing must be selected from content data captured in takes. For example, in the case of video data of an interview in a news program for broadcasting, special video data including a scene of a critical moment when a strobe flash is emitted from a camera to an object is often included.

Thus, for example, in order to select special video cuts corresponding to special video data including, for example, a scene with a flash, generally, after imaging, content data recorded on a recording medium is played back from the beginning by a recording/playback apparatus such as a video tape recorder (VTR) and special video data needed is selected by a person in charge of editing.

However, in order for logging, i.e., selecting video cuts corresponding to special video data, content data captured must be played back from the beginning.

Furthermore, video cuts corresponding to special video data are often selected by playing back and rewinding content data repeatedly.

Since coarse editing includes a process of logging content data by visually searching for special video data from a plurality of pieces of content data captured on a take-by-take basis, and a process of extracting video cuts by specifying ranges (In-points and Out-points) of video cuts, improvement in the efficiency of coarse editing has been inhibited.

SUMMARY OF THE INVENTION

The present invention has been made in view of the problems described above, and it is an object of the present invention to provide a content editing assistance system in which content data is selected and a video cut is extracted as needed from content data based on a take-metadata file that is distinguished from content data and that is recorded on a recording medium during imaging, serving to improve the efficiency of editing.

To this end, the present invention, in one aspect thereof, provides a content editing assistance system including a mark generator for generating electronic mark data relating to content data; a take-metadata generator for generating a take-metadata file based on the electronic mark data generated for each take; a manager for managing the content data and the take-metadata file relating to the content data as separate files; a list generator for generating electronic-mark-list data based on the take-metadata file; and an editor for editing the electronic-mark-list data.

The present invention, in another aspect thereof, provides a video processing apparatus including a mark generator for generating electronic mark data relating to content data; a take-metadata generator for generating a take-metadata file for each take, based on the electronic mark data; and a manager for managing the content data and the take-metadata file relating to the content data as separate files.

The present invention, in another aspect thereof, provides a playback apparatus for playing back content data, including a player for playing back data recorded on a recording medium; and a list generator for generating electronic-mark-list data based on a take-metadata file generated for each take and recorded on the recording medium together with the content data.

The present invention, in another aspect thereof, provides an editing apparatus including an editor for editing electronic-mark-list data that is generated based on a take-metadata file generated for each take and recorded on a recording medium; and a display controller for displaying the electronic-mark-list data.

The present invention, in another aspect thereof, provides a content processing method including the steps of generating electronic mark data relating to content data; generating a take-metadata file based on the electronic mark data generated for each take; and managing the content data and the take-metadata file relating to the content data as separate files.

The present invention, in another aspect thereof, provides a content processing method including the steps of reading a take-metadata file generated for each take and recorded on a recording medium together with content data; and generating electronic-mark-list data based on the take-metadata file.

The present invention, in another aspect thereof, provides a computer program for allowing a computer to execute a content processing method comprising the steps of generating electronic mark data relating to content data; generating a take-metadata file based on the electronic mark data generated for each take; and managing the content data and the take-metadata file relating to the content data as separate files.

The present invention, in another aspect thereof, provides a computer program for allowing a computer to execute a content processing method comprising the steps of reading a take-metadata file generated for each take and recorded on a recording medium together with content data; and generating electronic-mark-list data based on the take-metadata file.

BRIEF DESCRIPTION OF THE DRAWINGS

FIG. 2 is a diagram showing types of electronic mark data used in the video-content editing assistance system according to the embodiment;

FIG. 3 is a diagram showing a format of KLV-encoded electronic mark data used in the video-content editing assistance system according to the embodiment;

FIG. 4 is a diagram showing the overall structure of a take-metadata file used in the video-content editing assistance system according to the embodiment;

FIG. 15 is a schematic diagram showing the structure of electronic-mark-list data before editing, used in the video-content editing assistance system according to the embodiment;

FIG. 19 is a schematic diagram showing the structure of electronic-mark-list data after editing, used in the video-content editing assistance system according to the embodiment.

DESCRIPTION OF THE PREFERRED EMBODIMENTS

Now, preferred embodiments of the present invention will be described in detail with reference to the accompanying drawings. In the following description and the accompanying drawings, components having substantially the same functions and configurations are designated by the same numerals, and repeated descriptions thereof will be refrained.

1. System Configuration

Figure 1:
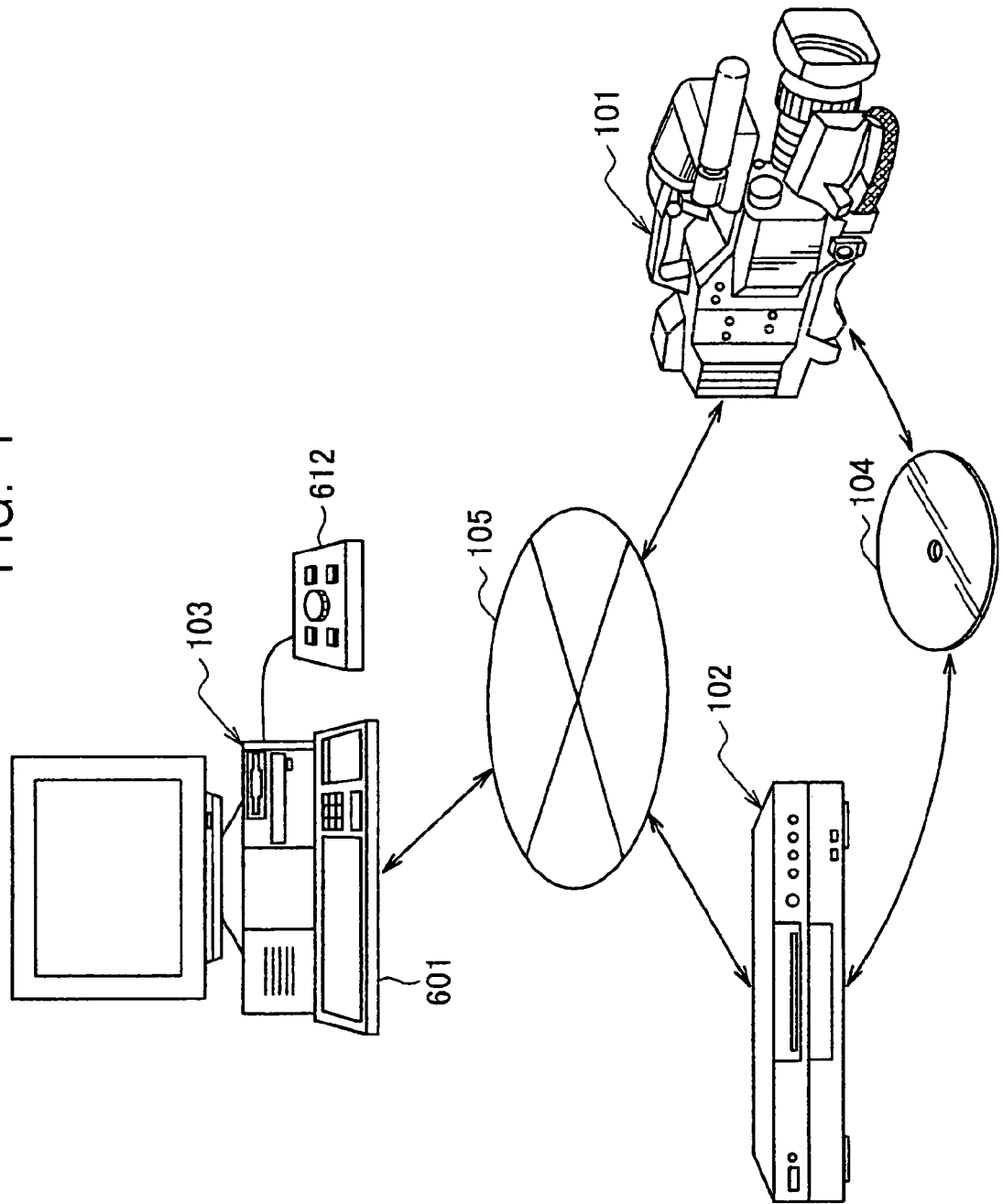
FIG. 1 is a block diagram schematically showing the configuration of a video-content editing assistance system according to an embodiment of the present invention.

First, the configuration of a video-content editing assistance system according to an embodiment of the present invention will be described with reference to FIG. 1. FIG. 1 is a block diagram schematically showing the configuration of a video-content editing assistance system according to an embodiment of the present invention.

Referring to FIG. 1, the video-content editing assistance system includes an imaging apparatus 101, a playback apparatus 102 for playing back content data recorded on an optical disk 104, an editing apparatus 103 for displaying and editing content data played back, and a network 105 connecting at least two of the imaging apparatus 101, the playback apparatus 102, and the editing apparatus 103 with each other. However, without limitation to the above configuration, implementation is possible without the network 5. In that case, the optical disk 104 is used off-line among the imaging apparatus 101, the playback apparatus 102, and the editing apparatus 103. Content data includes at least one frame, and is composed of, for example, video data only, audio data only, or both video data and audio data. The imaging apparatus 101 is, for example, a video processing apparatus that is capable of recording content data.

With regard to each of the imaging apparatus 101, the playback apparatus 102, and the editing apparatus 103, the number of units is not limited to one, and a plurality of units may be provided. For example, content data captured by a plurality of imagers 101 can be sent to the playback apparatus 102 or the editing apparatus 103 via the optical disk 104 or the network 105.

Also, a central server (not shown) may be provided among the imaging apparatus 101, the playback apparatus 102, and the editing apparatus 103, thereby implementing a client/server network system with the imaging apparatus 101, the playback apparatus 102, and the editing apparatus 103 as clients.

The imaging apparatus 101 is a video camera such as a camcorder, and is used, for example, for gathering news for news programs for broadcasting, recording a sports match, or imaging a material for a movie.

Referring to FIG. 1, the imaging apparatus 101, with the optical disk 104 set thereon, allows recording a take-metadata file, content data, etc. on the optical disk 104 at sites of newsgathering. The optical disk 104 is, for example, a DVD-R or a DVD-RAM. However, without limitation to the examples, the optical disk 104 may be, for example, a magneto-optical disk or an optical disk that allows random access, or a magnetic tape conforming to the digital VTR format referred to as the D10 Format. The take-metadata file includes at least one piece of electronic mark data generated in one take. The take-metadata file is created based on electronic mark data that is generated, for example, by the imaging apparatus 101. The electronic mark data and the take-metadata file will be described later in detail.

The imaging apparatus 101 is capable of recording content data captured by newsgathering on the optical disk 104 and playing back the content data without using the playback apparatus 102.

The content data is, for example, still-picture data representing a still picture, a painting, etc., moving-picture data representing a movie, a play, etc., or data composed of both still-picture data and moving-picture data.

The imaging apparatus 101 records content data captured in each take on the optical disk 104. A take refers to an imaging process continued from a start to an end of a single recording operation.

In order to produce a perfect packaged data through final editing, during coarse editing prior to the final editing, content data that will be needed in the final editing is collected from a plurality of pieces of content data recorded by the imaging apparatus 101 on a take-by-take basis. For example, the perfect packaged data is broadcasted in a broadcast program.

In the coarse editing, logging is performed; that is, content data needed is selected from the content data collected. Then, ingesting is performed; that is, an extraction start point (In-point) and an extraction end point (Out-point) are set in the content data selected, whereby a video cut is extracted. A video cut refers to content data captured in a take, with an In-point and an Out-point set. At least one video cut is extracted from content data captured in a take.

Through the coarse editing and the final editing, perfect packaged data that is to be, for example, broadcasted in a program is produced. Since a take-metadata file relating to a video cut including special video data is not recorded in the perfect package data according to the known art, usually, the content data is played back from the beginning, and editing points that serve as an In-point and an Out-point of a video cut needed for final editing are manually set and recorded, for example, on paper.

The playback apparatus 102 is capable of randomly accessing content data or take-metadata files recorded on the optical disk 104 and to directly read data as needed. The playback apparatus 102 is also capable of creating electronic-mark-list data based on take-metadata files. Content data or electronic-mark-list data read by the playback apparatus 102 is transmitted to the editing apparatus 103 via the network 105. Although the description has been made in the context of an example of playback by the playback apparatus 102, without limitation to the example, alternatively, for example, content data or take-metadata files may be recorded on the optical disk 104. The electronic-mark-list data will be described later in detail.

The editing apparatus 103 receives content data or electronic-mark-list data played back by the playback apparatus 102 via the network 105, and displays the content data on a display. Furthermore, the editing apparatus 103 is capable of displaying the electronic-mark-list data to allow editing of the electronic-mark-list data. The editing of the electronic-mark-list data will be described later in detail.

The network 105 may be, for example, an optical fiber network such as an FDDI (Fiber Distributed Data Interface) network, a wireless network based on, for example, IEEE 802.11a, a wired network based on, for example, RS-232C or RS-422, or a satellite communication network.

1.1 Electronic Mark Data

Next, electronic mark data used in this embodiment will be described.

Electronic mark data is metadata representing, for example, an index relating to content data captured by imaging. Thus, the electronic mark data serves as an index of video data included in content data. For example, during coarse editing, it is possible to grasp what the video data included in the content data is like without playing back the content data, so that the efficiency of editing is improved. The electronic mark data is not limited to video data included in content data, and may be, for example, an index of audio data included in content data. Content data may also include special video data such as video data including a scene with a flash. The special video data will be described later in detail.

The electronic mark data can be transmitted, for example, according to a method defined by the SMPTE (Society of Motion Picture and Television Engineers), based on the SDI (Serial Digital Interface).

As shown in FIG. 2, names of items in the electronic mark data in this embodiment are predefined as reserved words. Thus, for example, among interfaces of the imaging apparatus 101, the playback apparatus 102, the editing apparatus 103, etc. in this embodiment, electronic mark data can be handled in a common manner without converting it into different formats that can be interpreted by the respective apparatuses.

Referring to FIG. 2, elements of the electronic mark data include the following: "_RecStart" (imaging-start mark) representing a point where recording was started; "_RecEnd" (imaging-end mark) representing a point where recording was ended; "_ShotMark1" (shot mark 1) representing a point to be noticed, specified when a predetermined button is pressed by a cameraman during imaging; "_ShotMark2" (shot mark 2) representing a point to be noticed that is different from the point of "_ShotMark1"; "_Cut" (cut mark) representing a cutting point, set during editing at a point of video splicing; "_Flash" (flash mark) representing a position where a flash was detected; "_FilterChange" (filter-change mark) representing a point where a lens filter of the imaging apparatus 101 was changed; "_ShutterSpeedChange" (shutter-change mark) representing a point where the shutter speed of an electronic shutter implemented by an imaging element such as a CCD element was changed; "_GainChange" (gain-change mark) representing a point where gain was changed; "_WhiteBalanceChange" (white-balance mark) representing a point where white balance was changed; "_OverBrightness" (over-brightness mark) representing a point where video output level exceeded a limit value; "_OverAudioLimiter" (large-sound-volume mark) representing a point where audio output level exceeded a limit value; "_In-XXX" (editing-start mark) representing a point where extraction was started when extracting a video cut; and "_Out-XXX" (editing-end mark) representing a point where extraction was ended when extracting a video cut. The electronic mark data is not limited to the example described above, and may be a subset of these elements or include additional elements.

The elements of electronic mark data shown in FIG. 2 are recorded as described below with regard to relative timing in content data. "_RecStart" corresponds to a frame where the recording of content data was started. "_RecEnd" corresponds to a frame where the recording of content data was ended. "_ShotMark1" and "_ShotMark2" correspond to points specified during imaging. "_Cut" corresponds to a frame where a cutting point was detected. "_Flash" corresponds to a frame where a flash was detected. "_FilterChange" corresponds to a frame where a lens filter was changed. "_ShutterSpeedChange" corresponds to a frame where the shutter speed was changed. "_GainChange" corresponds to a frame where gain was changed. "_WhiteBalanceChange" corresponds to a frame where white balance was changed. "_OverBrightness" corresponds to a frame where video output level exceeded a limit value. "_OverAudioLimiter" corresponds to a frame where audio output level exceeded a limit value. "_In-XXX" and "_Out-XXX" correspond to frames including points specified during editing.

For example, "XXX" in "_In-XXX" and "_Out-XXX" are designated sequentially by numerals, alphabets, or the like each time an In-point or an Out-point is added, such as "_In-001", "_In-002", "In-003", and so forth.

Electronic mark data such as "_Flash" or "_OverAudioLimiter." is generated automatically when special video data such as flash video data or large-sound-volume audio data is detected by the imaging apparatus 101. A process of generating electronic mark data such as "Flash" when special video data such as flash video data is detected will be described later in detail. With regard to the electronic mark data in this embodiment, an UMID (unique material identifier) may be used to identify which frame of which content data the electronic mark data relates to. An UMID is an identifier that allows global identification of content data. Use of UMIDs allows management at the level of frames of content data. Thus, by recording the electronic mark data on files on a frame basis and also recording UMIDs on files on a frame basis, a frame of content data can be identified from the electronic mark data.

The electronic mark data included in content data is indexed during coarse editing so that video scenes that are needed can be selected efficiently. Accordingly, video scenes needed for final editing can be selected in advance efficiently without playing back content data repeatedly by a recording/playback apparatus such as a VTR.

Next, the data structure of the electronic mark data will be described with reference to FIG. 3. FIG. 3 is a diagram showing the electronic mark data used in this embodiment as encoded in the KLV (key-length-value) format.

The electronic mark data is metadata associated with (linked to) content data, representing features of a video scene, for example, in text format, as shown in FIG. 2. For example, features of a video scene such as a flash and a start of recording are represented by text data such as "_Flash" and "_RecStart" as indices.

As shown in FIG. 3, the electronic mark data is KLV encoded before being transmitted over the network 105 based on the SDI (Serial Digital Interface). The KLV-encoded electronic mark data consists of maximum 49 bytes. The format is based on SMPTE 335M/RP210A (Metadata Dictionary).

As shown in FIG. 3, the KLV-encoded electronic mark data consists of a "key" section consisting of 16 bytes, a "length" section consisting of one byte, and a "value" section consisting of maximum 32 bytes.

The "key" section is an identifier representing a KLV-encoded data item of electronic mark data based on SMPTE 335M/RP210A (Metadata Dictionary). The SMPTE Metadata Dictionary defines identifiers representing various data items.

The electronic mark data in this embodiment can be encoded based on an item named "Cataloguing, Indexing, Thesaurus or Gazetter system used", defined in the SMPTE Metadata Dictionary.

When the electronic mark data is encoded using the ISO (International Organization for Standardization) 7-Bit Coded Character Set, the element name is represented by "06(h) 0E(h) 2B(h) 34(h) 01(h) 01(h) 01(h) 01(h) 03(h) 02(h) 01(h) 02(h) 02(h) 90(h) 90(h) 90(h)".

The "length" section represents the length of data following the "length" section in bytes. When the electronic mark data is encoded using the ISO 7-Bit Coded Character Set, the maximum data length is 32 bytes (20(h)). Similarly to the ISO 7-Bit Coded Character Set, UCS (Universal Multiple-Octet Coded Character Set) is a coded character set jointly defined by the ISO and the IEC (International Electrotechnical Commission).

The "value" section is a field consisting of text data representing the body of the electronic mark data.

The KLV-encoded electronic mark data is transmitted according to a method dictated by the SMPTE standard. For example, if the KLV-encoded electronic mark data is transmitted based on the SDI (Serial Digital Interface), the KLV-encoded electronic mark data is included in a V-ancillary area of video data.

The electronic mark data in this embodiment can also be encoded in UTF-16 (16-Bit UCS Transformation Format, or Unicode), based on "Cataloguing, Indexing, Thesaurus or Gazetter system used" defined in the SMPTE Metadata Dictionary.

When the electronic mark data is encoded using the UTF-16, the element name is represented by "06(h), 0E(h), 2B(h), 34(h), 01(h), 01(h), 01(h), 04(h), 03(h), 02(h), 01(h), 02(h), 02(h), 01(h), 00(h), 00(h)".

When the UTF-16 is used for encoding, the data length of the "value" section is not limited, and each character is represented using two bytes.

1.2 Take-Metadata File

Next, a take-metadata file used in this embodiment will be described with reference to FIG. 4. FIG. 4 is a diagram showing the overall structure of a take-metadata file used in this embodiment.

The take-metadata file is generated by the imaging apparatus 101 based on electronic mark data generated for each take during imaging. Thus, the takemetadata file is metadata including an index of content data captured in each take.

As shown in FIG. 4, the take-metadata file is written using a tag set that is based on the XML (Extensible Markup Language). The take-metadata file at least includes an imaging-information section 301 representing imaging information of the imaging apparatus 101, a video-filename section 302 representing a filename of content data, and a mark section 303 including electronic mark data generated for each take.

The imaging-information section 301 is defined between a "<Device>" tag and a "</Device>" tag. In the imaging information section 301, for example, a model type of the imaging apparatus 101 is defined by a "<Model name="ABC-0123" serialNo="12-34-56-78"/>" tag. However, without limitation to the example, other tags may be included.

The video-filename section 302 is defined between a "<ComponentMaterial>" tag and a "</ComponentMaterial>" tag. In the video-filename section 302, for example, a filename of video data included in content data is defined as "<Video src="video1.mxf"/>", and a filename of audio data is defined as "<Audio src="audio1.mxf"/>". However, without limitation to the examples, other filenames may be defined. "mxf" serving as an extension for the filenames represents the "Material Exchange Format".

The mark section 303 is defined between "<EssenceMarkTable>" and "</EssenceMarkTable>", and includes electronic mark data and a date/time-information code that serves as time information. Although the date/time-information code including a date and a time is used in this embodiment, without limitation to the example, alternatively, for example, a time-information code including a time, a frame number that serves as time information in a broader sense, or a time code may be used.

Referring to FIG. 4, for example, of the section defined as "<EssenceMark value="_Flash">01/10/23/09:43:52:01</EssenseMark>", "_Flash" is electronic mark data, and "02/10/23/09:43:52:01" is the date/time-information code. The date/time-information code is not limited to the example, and may be, for example, "02:10:23:09:43:52:01". By recording the electronic mark data and the date/time-information code together in the take-metadata file, a frame of content data where the electronic mark data is recorded can be quickly identified and content data can be played back from the frame.

The embodiment has been described in the context of an example where a date/time-information code is used for identifying a frame of content data. However, without limitation to the example, alternatively, for example, a time code, a frame number as counted from the first frame of content data, or a frame time code (FTC) may be used. An FTC is a time-code-format representation of a frame number as counted from the first frame.

The date/time-information code represents year, month, day, time, and a frame value. For example, "02/10/23/09:43:52:01" represents "year 2002, October 23, 9 o'clock, 43 minutes, 52 seconds, and frame value 01". For example, if one second of video data is composed of thirty frames, the frame value is in a range of 00 to 29. Time is circularly counted up by a 24-hour clock.

The take-metadata file is generated by the imaging apparatus 101 for each take and is recorded on the optical disk 104 as a file separate from the content data. The take-metadata file may be recorded in a region separate from a recording region of the optical disk 104 where the content data is recorded. The date/time-information code in this embodiment is assigned to each frame constituting the content data. Thus, even if imaging spans several days, each frame can be uniquely identified by the date/time-information code.

Figure 5:
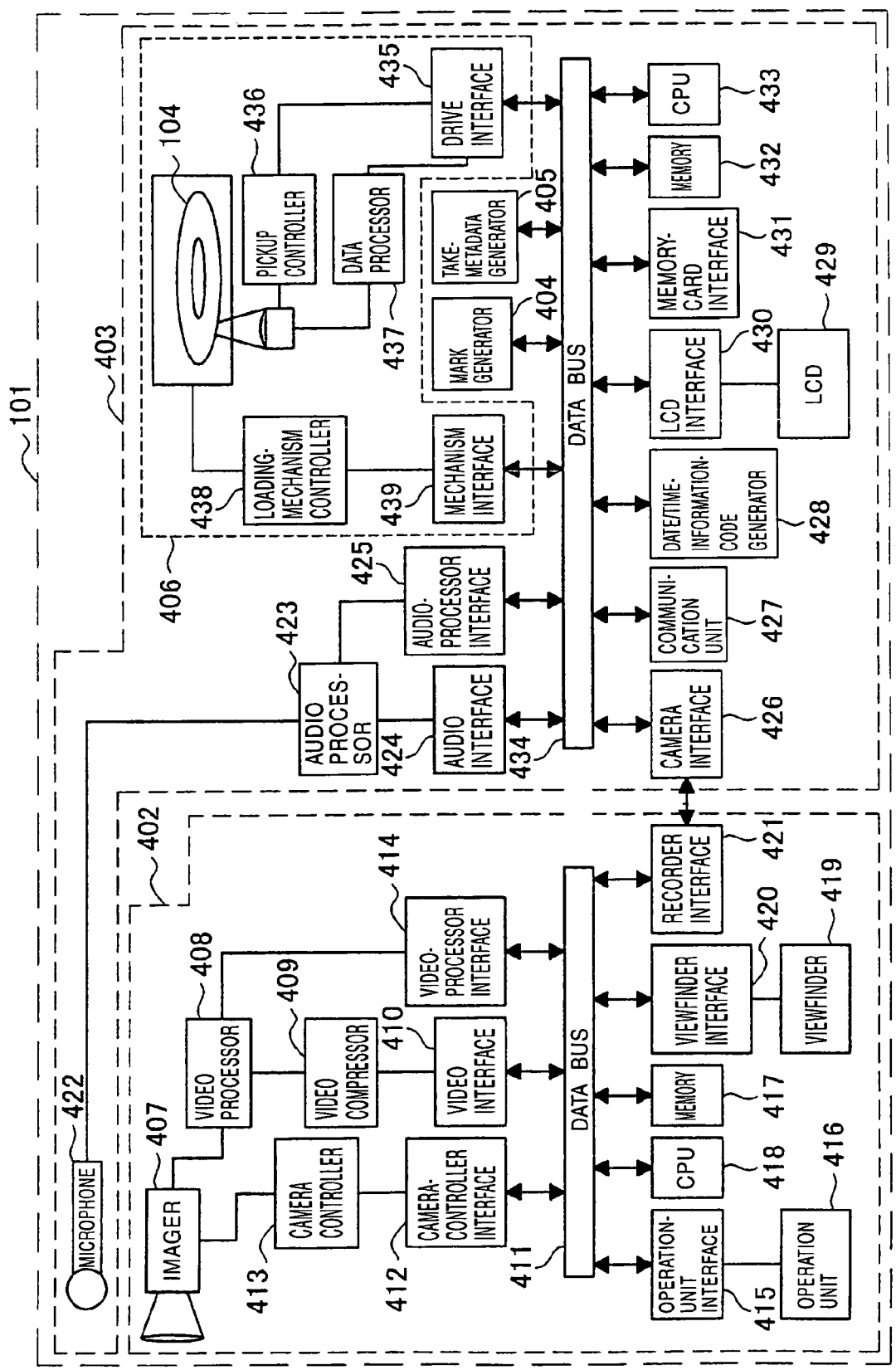
FIG. 5 is a block diagram schematically showing the configuration of an imaging apparatus in the video-content editing assistance system according to the embodiment.
Figure 6:
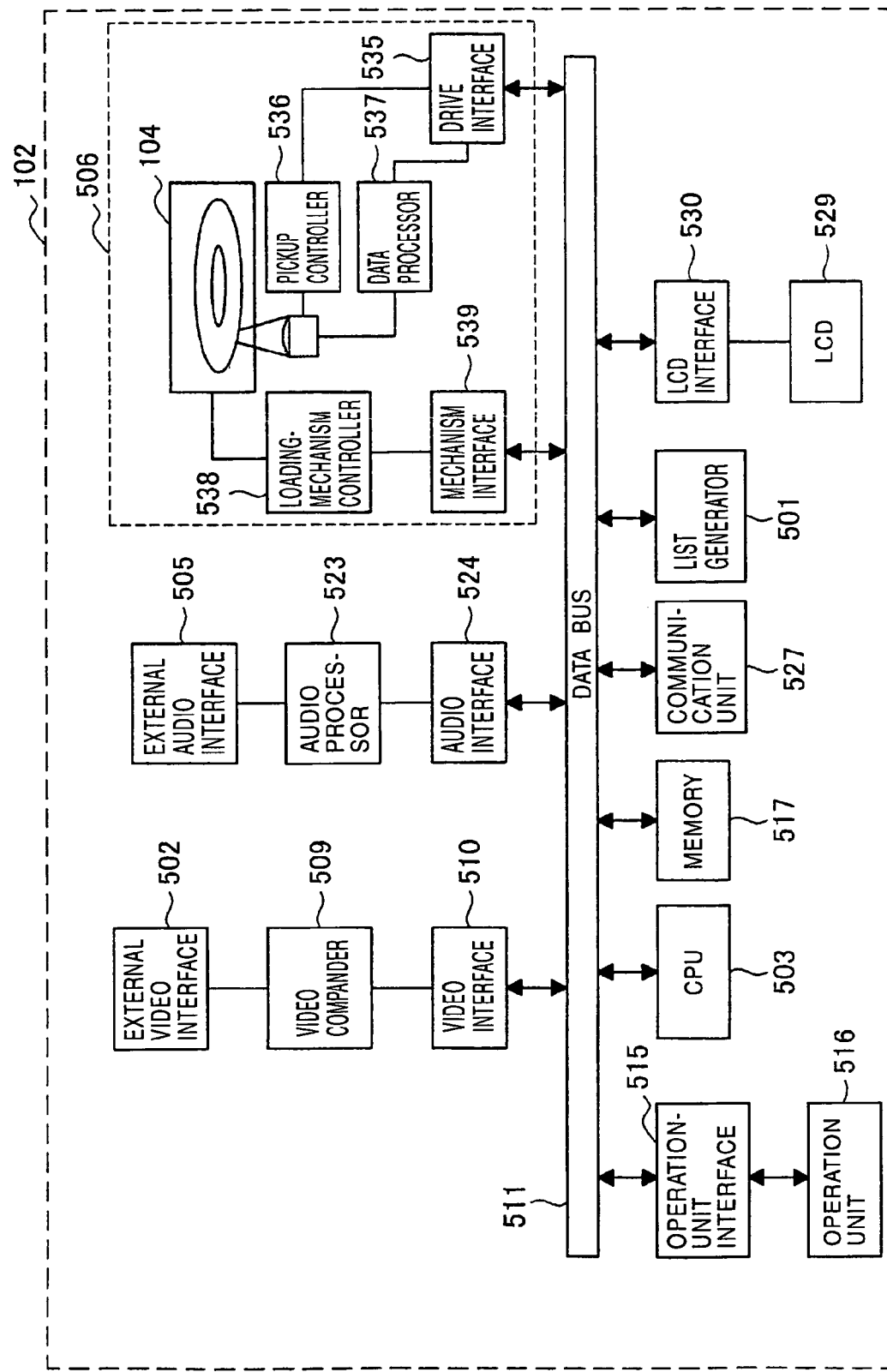
FIG. 6 is a block diagram schematically showing the configuration of a playback apparatus in the video-content editing assistance system according to the embodiment.
Figure 7:
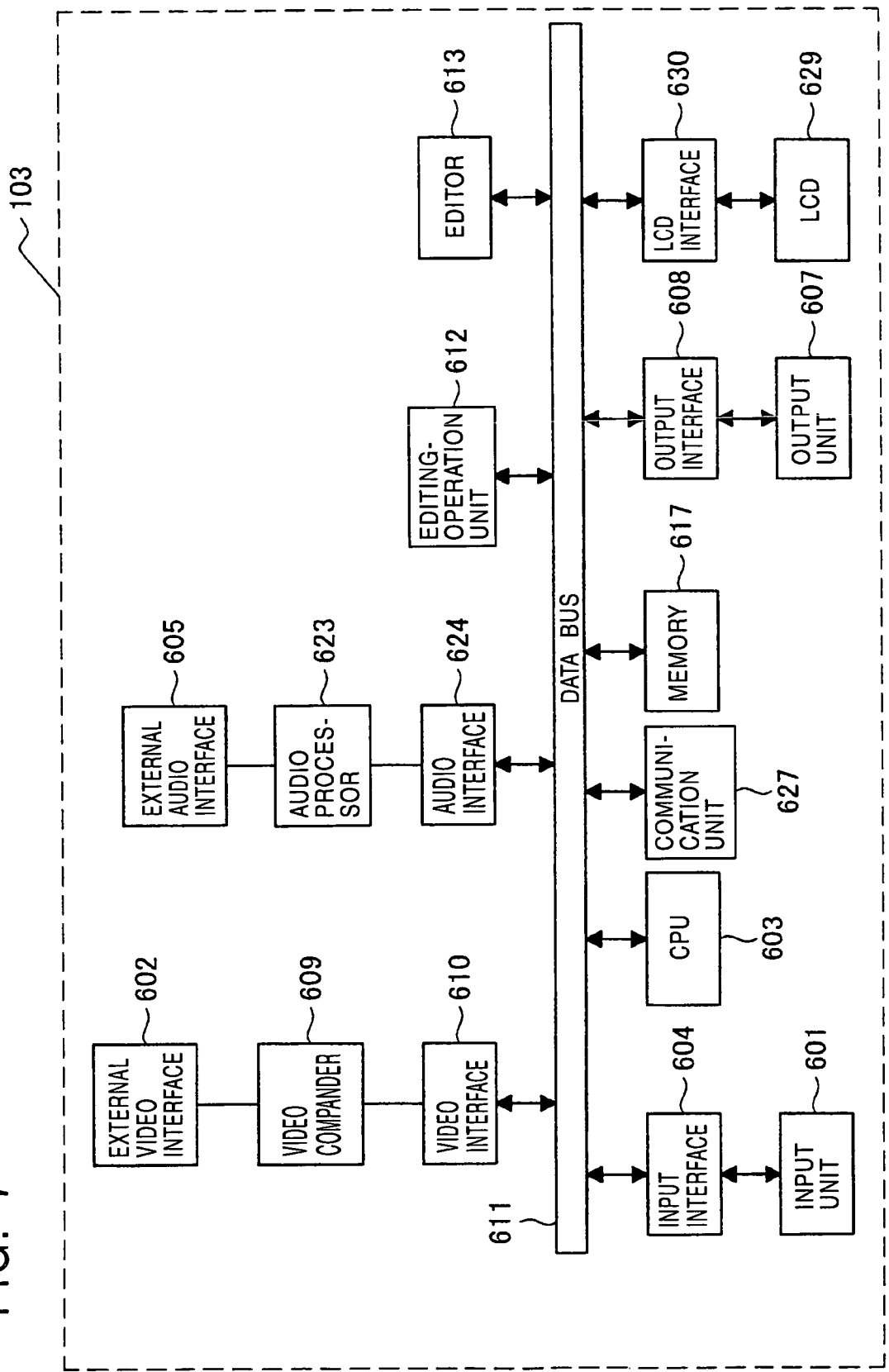
FIG. 7 is a block diagram schematically showing the configuration of an editing apparatus in the video-content editing assistance system according to the embodiment.

2. Configurations of the Components of the Video-Content Editing Assistance System Next, the configurations of the components of the video-content editing assistance system according to this embodiment will be described with reference to FIGS. 1, 5, 6, and 7. FIG. 5 is a block diagram schematically showing the configuration of the imaging apparatus 101 in the video-content editing assistance system according to this embodiment. FIG. 6 is a block diagram schematically showing the configuration of the playback apparatus 102 in the video-content editing assistance system according to this embodiment. FIG. 7 is a block diagram schematically showing the configuration of the editing apparatus 103 in the video-content editing assistance system according to this embodiment.

2.1 Network 105

The network 105 connects at least two of the imaging apparatus 101, the playback apparatus 102, and the editing apparatus 103 with each other to allow bilateral communication therebetween. In this embodiment, the network 105 implements wired communication based on, for example, RS-422 or RS-232C. However, without limitation to the examples, the network 105 may implement, for example, wireless communication based on, for example, IEEE 802.11a, satellite communication, or optical communication using optical fibers.

2.2 Imaging Apparatus 101

Next, the imaging apparatus 101 will be described with reference to FIG. 5. FIG. 5 is a block diagram schematically showing the configuration of the imaging apparatus 101 in the video-content editing assistance system according to this embodiment.

The imaging apparatus 101 is capable of imaging an object, recording content data captured on the optical disk 104, and playing back the content data recorded on the optical disk 104.

Furthermore, for example, when video data includes a scene with a flash, the imaging apparatus 101 is capable of generating electronic mark data relating to flash video data representing the scene with a flash, and generating a take-metadata file from the electronic mark data generated for each take and recording it on the optical disk 104. Although the imaging apparatus 101 is an apparatus including a camera and an optical disk drive, a camera and an optical disk drive need not be integrated and may be separate.

As shown in FIG. 5, the imaging apparatus 101 includes a camera block 402 and a recorder block 403. The camera block 402 generates video data, and controls various processes of the imaging apparatus 101 such as zooming, playback, and recording. The recorder block 403 generates audio data, electronic mark data, and take-metadata files, records the audio data, the video data, the and take-metadata files on the optical disk 104, and plays back the data recorded.

The camera block 402 includes an imager 402, a video processor 408, a video compressor 409, a video interface 410, a data bus 411, a camera controller 413, a camera-controller interface 412, a video-processor interface 414, an operation-unit interface 415, an operation unit 416, a memory 417, a central processing unit (CPU) 418, a viewfinder 419, a viewfinder interface 420, and a recorder interface 421.

The imager 407 includes at least one imaging element (imaging device). For example, the imaging element is, for example, a solid-state imaging device such as a CCD, having a plurality of pixels implemented by photoelectric elements two-dimensionally arranged on a photoreceptor surface, and it converts an optical image received from an object into an electric image signal.

The video processor 408 performs A/D conversion, white-balancing, γ correction, aperture correction, etc. on video data generated by the imager 407.

The video compressor 409, if compression is needed, compresses (encodes) the video data having been A/D-converted by the video processor 408, for example, based on Motion JPEG, MPEG1, MPEG2-TS, or MPEG2-PS. The video interface 410 serves as an intermediary for transferring (sending or receiving) the video data compressed by the video compressor 409 via the data bus 411 as content data. If compression is not needed, the video processor 409 outputs video data to the video interface 410 without compressing the video data.

The video processor interface 414 functions as an intermediary for transferring control-processor data for A/D conversion, compression, etc. between the video processor 408 and the data bus 411.

The camera controller 413 controls aperture or zooming of the imager 407, for example, based on commands input from the operation unit 416. The camera-controller interface 412 functions as an intermediary for transferring commands input from the operating unit 416 to the camera controller 413 via the data bus 411.

The operation unit 416 allows operations such as adjustment of zoom or aperture and start of recording. The operation-unit interface 415 functions as an intermediary for transferring commands input from the operating unit 416 to the data bus 411.

The CPU 418 controls operations of the components of the camera block 402. The memory 417 stores, for example, imaging information regarding zoom or aperture during past imaging. The memory 417 is implemented, for example, by a RAM or an EEPROM. However, without limitation to the examples, other types of memory may be used as long as the memory allows storage of data such as imaging information.

The viewfinder 419 is a device for determining a range of object to be imaged. The viewfinder 419 displays video data being captured or being played back, and also displays electronic mark data when electronic mark data has been generated. The viewfinder interface 420 functions as an intermediary for transferring video data, electronic mark data, etc. to the viewfinder 419 via the data bus 411.

The recorder interface 421 functions as an intermediary for transferring data between the camera block 402 and the recorder block 403.

The recorder block 403 includes a mark generator 404, a take-metadata generator 405, a recorder 406, a microphone 422, an audio processor 423, an audio interface 424, an audio-processor interface 425, a camera interface 426, a communication unit 427, a date/time-information-code generator 428, an LCD (liquid crystal display) interface 430, an LCD 429, a memory-card interface 431, a memory 432, and a CPU 433.

The mark generator 404 generates electronic mark data relating to content data. For example, in the case of a start of recording, electronic mark data representing "_RecStart" is generated, and in the case of an end of recording, electronic mark data representing "_RecEnd" is generated.

Furthermore, upon detection of special video data included in content data captured, the mark generator 404 generates electronic mark data relating to the special video data. The special video data relates to a special scene of video data, and may include video data only, audio data only, or a combination of video data and audio data.

The special video data is content data such as flash video data including a scene with a flash or large-sound-volume audio data including a scene in which audio output level exceeds a limit value. However, without limitation to the examples, the video flash data may be, for example, chroma-flash video data in which color alternates between, for example, red and blue. The special video data will be described later in detail.

Thus, for example, in the case of content data including a scene with a flash, the mark generator 404 detects flash video data based on continuous flashing of light in content data transferred via the data bus 434, and generates electronic mark data representing "_Flash", relating to the flash video data. The electronic mark data generated by the mark generator 404 is stored in the memory 432.

The take-metadata generator 405 generates a take-metadata file based on electronic mark data generated for each take. More specifically, the take-metadata generator 405 extracts all the electronic mark data generated during continuous imaging from a start to an end of a single recording operation, and adds imaging information and date/time-information codes to the electronic mark data, thereby generating a take-metadata file shown in FIG. 4.

The camera interface 426 functions as an intermediary for transferring data between the camera block 402 and the recorder block 403.

The audio processor 423 performs A/D conversion, audio adjustment, etc. on audio data input from the microphone 422, and compresses, as required, the audio data having been A/D-converted.

The audio-processor interface 425 functions as an intermediary for transferring control-processor data relating to processing by the audio processor 423 between the audio processor 423 and the data bus 434. The audio interface 424 functions as an intermediary for transferring audio data having been compressed as required to the data bus 434 as content data.

The communication unit 427 exchanges data such as content data or a take-metadata file via the network 105.

The date/time-information code generator 428 performs time counting based on date/time-information code including year, month, day, and time during imaging, and adds a date/time-information code to each frame of content data. The date/time-information code is not limited to the above example as long as it allows identification of a frame of content data, and may be, for example, an information code including at least one of year, month, day, and time, or a frame number sequentially assigned from the first frame of content data.

The LCD 429 displays an image of content data, a date/time-information code, an audio output level, a take-metadata file, etc. The LCD interface 430 functions as an intermediary for transferring data via the data bus 434 so that the LCD 429 is allowed to display an image of content data, a date/time-information code, an audio output level, a take-metadata file, etc.

The memory interface 431 functions as an intermediary for transferring data such as imaging information recorded on a semiconductor memory such as a Memory Stick™. For example, the memory interface 431 allows imaging information used in another imaging apparatus to be read from or written to a Memory Stick or the like.

The CPU 433 controls the operations of the components of the recorder block 403. The memory 432 allows data such as electronic mark data to be stored therein. The memory 432 is, for example, a RAM or an EEPROM. However, without limitation to the examples, alternatively, the memory 432 may be a magnetic storage unit such as a hard disk.

The manager 406 records content data including video data and audio data captured in a take and a take-metadata file generated for each take on the optical disk 104 as separate files. Thus, by reading and displaying the take metadata recorded on the optical disk 104, the user is allowed to grasp the overall nature of the content data without playing back the content data.

The manager 406 need not necessarily record content data and a take-metadata file on the optical disk 104 as separate files. For example, the manager 406 may record content data including video data and audio data captured in a take and a take-metadata file generated for each take in separate regions of the optical disk 104. For example, a take-metadata file may be recorded in a recording region preceding or subsequent to a recording region in the same track of the optical disk 104 where content data is recorded, or content data and a take-metadata file may be recorded in predetermined regions of the optical disk 104.

The manager 406 includes a drive interface 435, a data processor 437 for converting content data and a take-metadata file into a format for recording on or playback from the optical disk 104, a pickup controller 436 for controlling a laser-beam generator/receptor (not shown) for writing or reading content data and a take-metadata file to or from the optical disk 104, a loading-mechanism controller 438 for controlling loading and unloading of the optical disk 104 for playback or recording, and a mechanism interface 439.

2.3 Playback Apparatus 102

Next, the playback apparatus 102 will be described with reference to FIG. 6. FIG. 6 is a block diagram schematically showing the configuration of the playback apparatus 102 in the video-content editing assistance system according to this embodiment.

The playback apparatus 102 plays back content data recorded on the optical disk 104, generates electronic mark data for coarse editing of content data based on a take-metadata file recorded on the optical disk 104, and records content data or a take-metadata file transmitted via the network 105. The playback apparatus 102 is, for example, is an apparatus that is capable of recording data on or playing back data from a DVD.

As shown in FIG. 6, the playback apparatus 102 includes an external video interface 502, a video compander 509, a video interface 510, a data bus 511, an operation-unit interface 515, an operation unit 516, a memory 517, a CPU 503, a communication unit 527, a list generator 501, an LCD 529, an LCD interface 530, an external audio interface 505, an audio processor 523, an audio interface 524, and a recording/playback unit 506.

The external video interface 502 functions as an intermediary for transferring video data included in content data to the outside of the playback apparatus 102 via the network 105. The external video interface 502 also functions as an intermediary for transferring video data transmitted via the network 105 to the video compander 509.

The video compander 509 compresses (encodes) or expands (decodes) video data based on, for example, Motion JPEG, MPEG1, MPEG2-TS, or MPEG2-PS. The video interface 510 functions as an intermediary for transferring compressed or expanded video data between the data bus 511 and the video compander 509 as content data.

The operation unit 516 is used to enter commands for operations such as playback/recording of content data. The operation-unit interface 515 functions as an intermediary for transferring commands input from the operation unit 516 to the data bus 511.

The CPU 503 controls the operations of the components of the playback apparatus 102. The memory 517 stores various data; for example, it caches a take-metadata file recorded on the optical disk 104. The memory 517 is, for example, a RAM or an EEPROM, but is not limited to the examples.

The external audio interface 505 functions as an intermediary for transferring audio data included in content data to the outside of the playback apparatus 102 via the network 105. The external audio interface 505 also functions as an intermediary for transferring audio data transmitted via the network 105 to the audio processor 523.

The audio processor 523 performs A/D conversion, audio adjustment, etc. on audio data, and compresses audio data as required. The audio interface 524 functions as an intermediary for transferring audio data between the data bus 434 and the audio processor 523.

The communication unit 527 exchanges data such as electronic-mark-list data, content data, or thumbnail data of content data via the network 105. The communication unit 527 also encodes a take-metadata file, content data, etc., for example, by KLV encoding, when the take-metadata file or content data is transmitted via the network 105 based on the SDI.

The LCD 529 displays status of processing such playback, recording, rewinding, or fast-forward, a date/time-information code, etc. The LCD interface 530 functions as an intermediary for transferring data via the data bus 511 so that the LCD 529 is allowed to display status of processing such as playback, recording, rewinding, or fast-forward, a date/time-information code, etc.

The recording/playback unit 506 plays back content data recorded on the optical disk 104, and extracts a take-metadata file. The recording/playback unit 506 is also capable of recording content data including video data and audio data captured by imaging and a take-metadata file generated for each take as separate files on the optical disk 104.

In this embodiment, the recording/playback unit 506 records content data and a take-metadata file as separate files on the optical disk 104. Alternatively, however, for example, the recording/playback unit 506 may record content data including video data and audio data captured by imaging and a take-metadata file generated for each take in separate recording regions of the optical disk 104. For example, a take-metadata file may be recorded in a recording region preceding or subsequent to a recording region on the same track of the optical disk 104 where content data is recorded, or content data and a take-metadata file may be separately recorded in predetermined regions of the optical disk 104.

The recording/playback unit 506 includes a drive interface 535, a data processor 537 for converting content data and a take-metadata file into a format for recording on or playback from the optical disk 104, a pickup controller 536 for controlling a laser-beam generator/receptor (not shown) for writing or reading content data and a take-metadata file to or from the optical disk 104, a loading-mechanism controller 538 for controlling loading and unloading of the optical disk 104 for playback or recording, and a mechanism interface 539.

2.4 Editing Apparatus 103

Next, the editing apparatus 103 will be described with reference to FIG. 7. FIG. 7 is a block diagram schematically showing the configuration of the editing apparatus 103 in the video-content editing assistance system according to this embodiment.

The editing apparatus 103 displays content data or electronic-mark-list data played back from the optical disk 104 by the playback apparatus 102. The editing apparatus 103 also allows editing of electronic-mark-list data such as modification and addition.

As shown in FIG. 7, the editing apparatus 103 includes an external video interface 602, a video compander 609, a video interface 610, a data bus 611, an input unit 601, an input-unit interface 604, an editing-operation unit 612, a memory 617, a CPU 603, a communication unit 627, an LCD 629, an LCD interface 630, an external audio interface 605, an audio processor 623, an audio interface 624, an output unit 607, an output-unit interface 608, and an editor 613.

The input unit 601 includes a mouse, a keyboard, and the like, and it allows editing of, for example, a filename of a take-metadata file with the keyboard. The input-unit interface 604 functions as an intermediary for transferring data between the input unit 601 and the data bus 611.

The editing-operation unit 612 is used for selecting a take-metadata file from electronic-mark-list data that is displayed, playing back content data (including fast forward, rewinding, etc.), or editing of electronic mark data such as addition.

Figure 8:
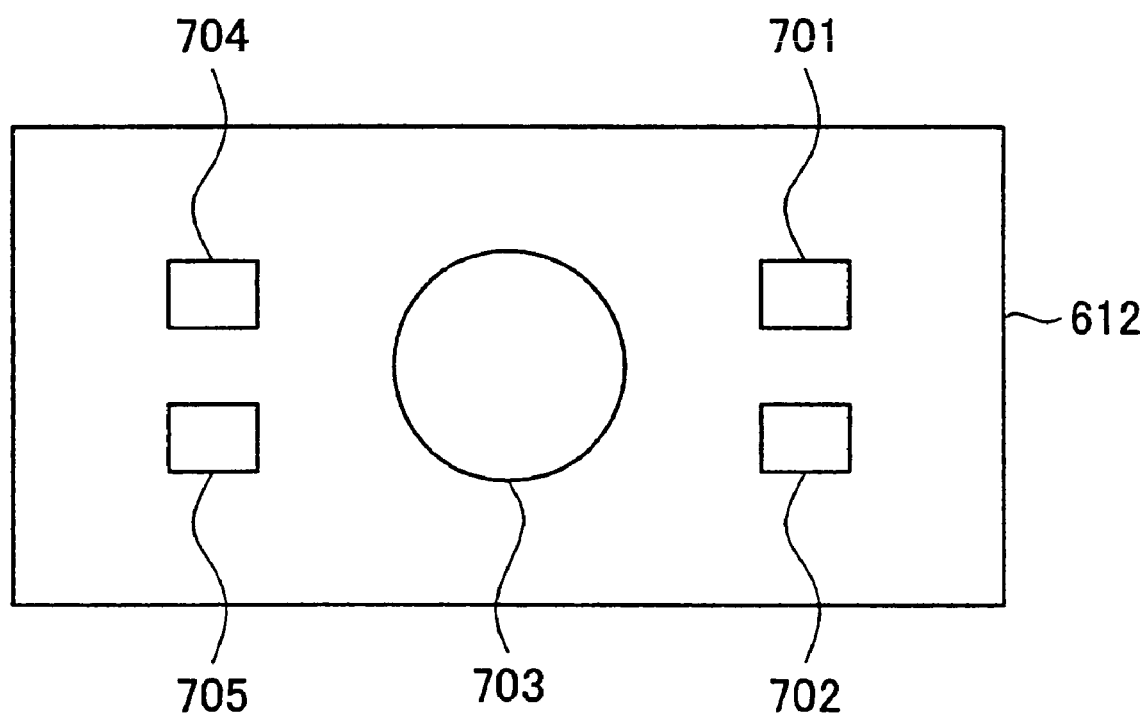
FIG. 8 is a plan view schematically showing the configuration of an editing-operation unit of the editing apparatus in the video-content editing assistance system according to the embodiment.

As shown in FIG. 8, the editing-operation unit 612 includes a mark-display button 701, a video-display button 702, a jog dial 703, an In-point specifying button 704, and an Out-point specifying button 705.

The mark-display button 701 is used to display a list of electronic mark data included in electronic-mark-list data. The video-display button 702 is used to play back video data from a specified point of electronic mark data selected. The jog dial 703 is, for example, cylindrical in shape, and is rotatable rightward and leftward in the circumferential direction with the axis of the cylinder as a center axis. In accordance with rotation of the jog dial 703 by the user, for example, a mark or a cursor for selecting electronic mark data is moved and the playback speed of content data is adjusted.

For example, the playback speed is a normal speed (×1) when the jog dial 703 is not rotated. The jog dial 703 is rotated rightward in the circumferential direction for fast-forward playback, with the playback speed becoming faster as the angle of rotation becomes larger. The jog dial 703 is rotated leftward in the circumferential direction for rewinding, the speed of rewinding becoming faster as the angle of rotation becomes larger.

The In-point specifying button 704 is used to specify a start point of a video scene or video cut that is needed for final editing. The Out-point specifying button 705 is used to specifying an end point of the video scene or video cut needed for final editing. By specifying an In-point and an-Out point, a range from a start to an end of a single video scene or a video cut is defined. Although the editing-operation unit 612 has been described as a unit including the jog dial 703, without limitation to the example, the editing-operation unit 612 may include, for example, a pointing device such as a mouse.

The external video interface 602 functions as an intermediary for transferring video data included in content data to the outside of the editing apparatus 103 via the network 105. The external video interface 602 also functions as an intermediary for transferring video data transmitted via the network 105 to the video compander 609.

The video compander 609 compresses (encodes) or expands (decodes) video data based on, for example, Motion JPEG, MPEG1, MPEG2-TS, or MPEG2-PS. The video interface 610 functions as an intermediary for transferring video data compressed or expanded between the data bus 611 and the video compander 609 as content data.

The CPU 603 controls the operations of the components of the editing apparatus 103. The memory 617 stores various data such as electronic-mark-list data. The memory 617 is, for example, a RAM or an EEPROM. However, without limitation to the examples, the memory 617 may be other types of storage media, such as a hard disk, as long as it allows data to be stored therein.

The external audio interface 605 functions as an intermediary for transferring audio data included in content data to the outside of the editing apparatus 103 via the network 105. The external audio interface 605 also functions as an intermediary for transferring audio data transmitted via the network 105 to the audio processor 623.

The audio processor 623 performs A/D conversion, audio adjustment, etc. on audio data, and compresses audio data as required. The audio interface 624 functions as an intermediary for transferring audio data between the data bus 611 and the audio processor 623.

The communication unit 627 exchanges data such as electronic-mark-list data, content data, and thumbnail data of content data via the network 105. When electronic-mark-list data or content data is transmitted via the network 105 based on the SDI, the communication unit 627 performs encoding such as KLV encoding on the electronic-mark-list data or content data.

The LCD 629 displays video data included in content data, a date/time-information code, an audio output level, a take-metadata file, etc. The LCD 629 is also capable of outputting sound. The LCD interface 630 functions as an intermediary for transferring data via the data bus 611 so that the LCD is allowed to display video data included in content data while also outputting sound, a date/time-information code, an audio output level, a take-metadata file, etc.

The editor 613 is used for selecting a video cut from video scenes needed for final editing, and editing of electronic-mark-list data to define a range of the video cut with an In-point and an Out-point.

The editing of electronic-mark-list data is, for example, addition of electronic mark data representing an In-point and an Out-point ("_In-XXX" and "_Out-XXX") for specifying an In-point and an Out-point of a video cut, or deletion of unneeded electronic mark data.

3. Operation of Video-Content Editing Assistance System

Next, the operation of the video-content editing assistance system according to this embodiment will be described.

Figure 9:
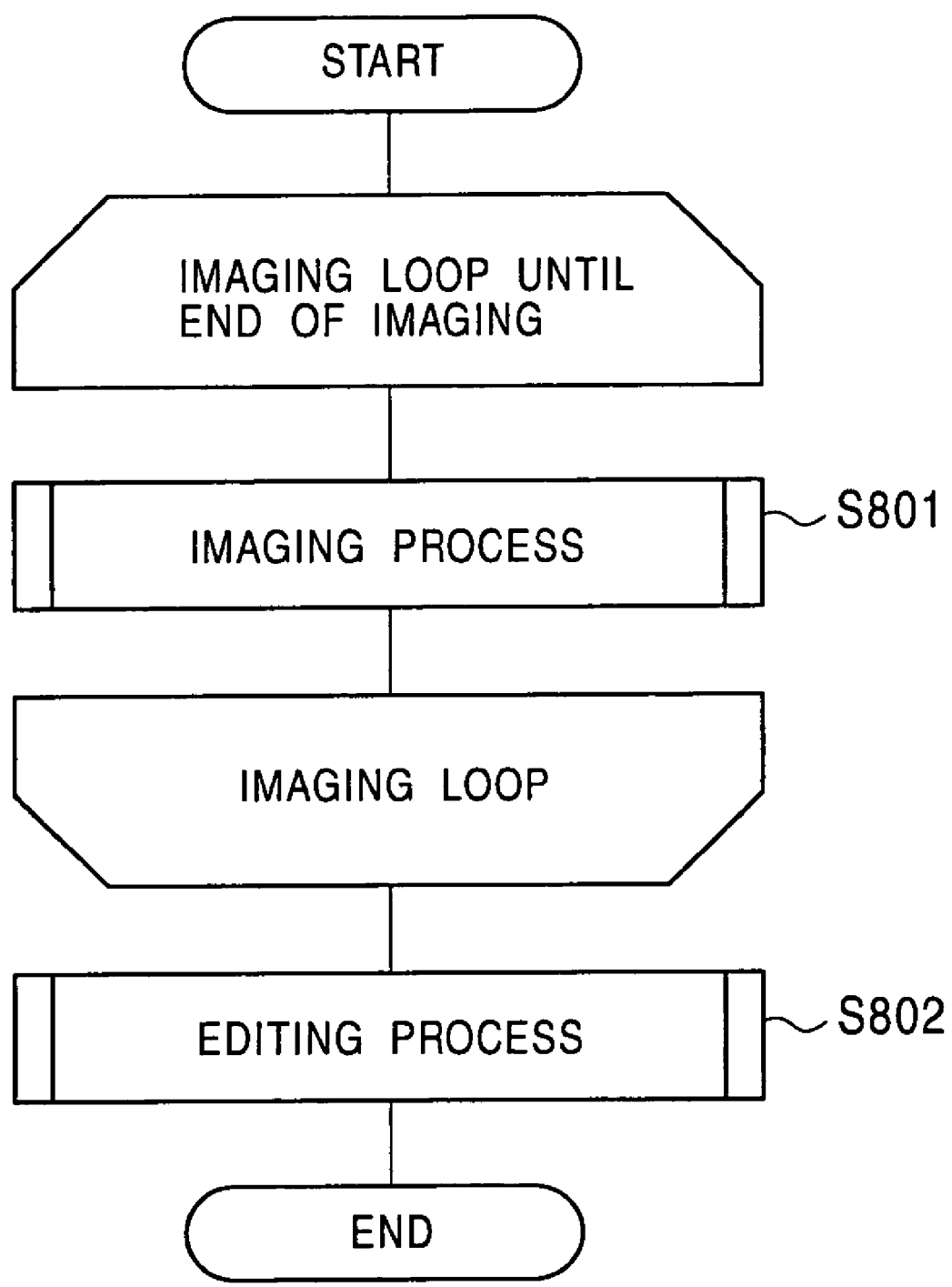
FIG. 9 is a flowchart showing the overall operation of the video-content editing assistance system according to the embodiment.

First, the overall operation of the video-content editing assistance system according to this embodiment will be described with reference to FIG. 9. FIG. 9 is a flowchart showing the overall operation of the video-content editing assistance system according to this embodiment.

Referring to FIG. 9, the operation of the video-content editing assistance system according to this embodiment includes an imaging process (step S801) and an editing process (step S802). The imaging process (S801) refers to a process in which content data is fully captured in at least one take for newsgathering or drama. A take refers to an imaging process that is continued from a start to an end of a single recording operation.

Thus, until completion of the entire imaging process for capturing content data used in a video cut, that is, until completion of capturing of content data, in all takes, the imaging process (S801) is continued. As shown in FIG. 9, an imaging loop including the imaging process (S801) is executed until completion of imaging.

Upon completion of the imaging process (S801), before final editing, an editing process (S802) of coarse editing or coarse splicing is executed. In the editing process (S802), content data needed for final editing is selected from content data captured in the imaging step (S801), and a range of content data that is to be actually used as a video cut is defined by specifying an In-point and an Out-point.

Upon completion of the editing process (S802), final editing is carried out based on editing-list data generated in the coarse editing, whereby content data to be broadcasted is produced. The imaging process (S801) and the editing process (S802) will be described below in more detail.

3.1 Editing Process (S801)

Figure 10:
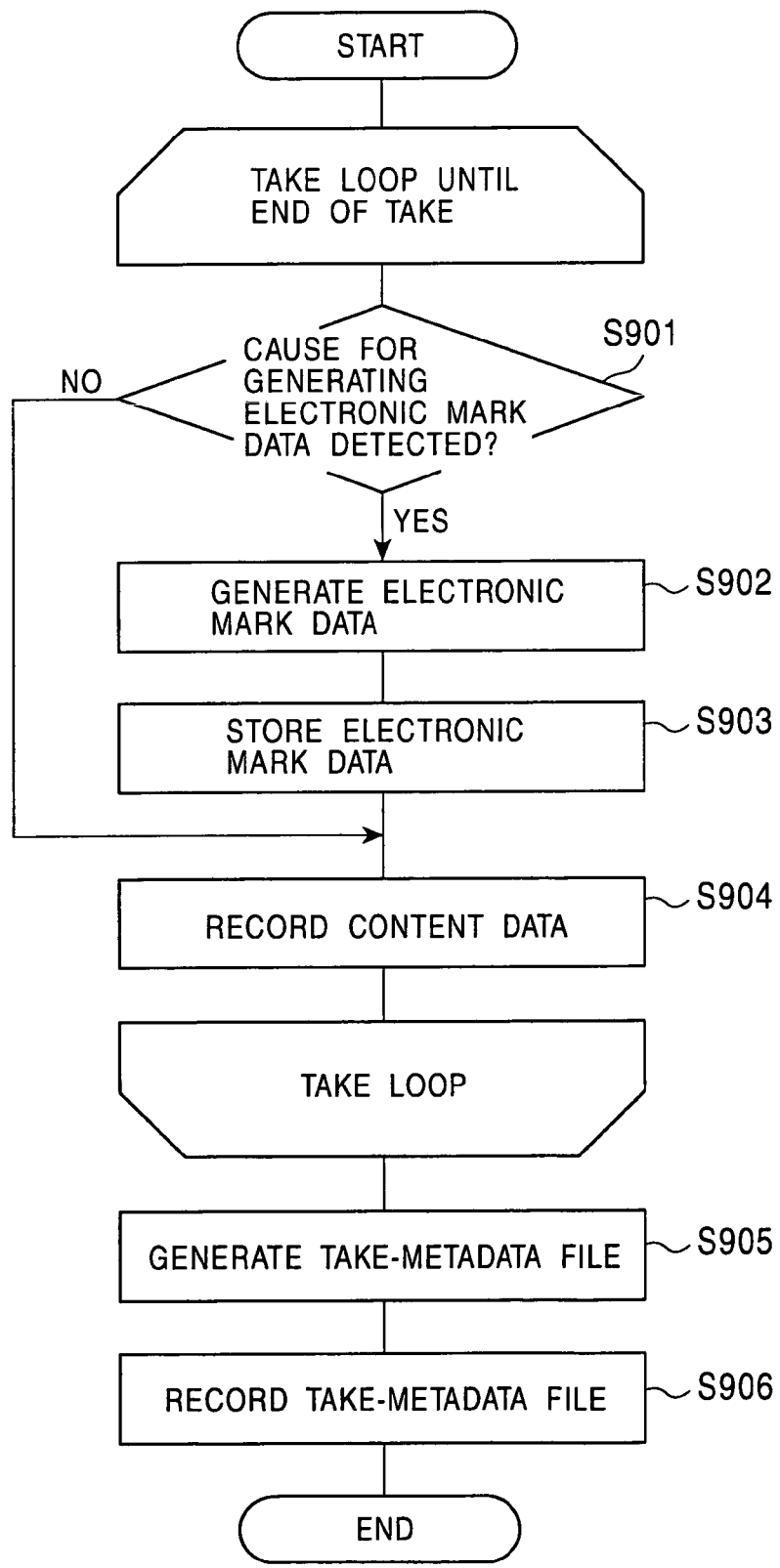
FIG. 10 is a flowchart showing the overall operation in an imaging step of the video-content editing assistance system according to the embodiment.

Next, the editing process (S801) will be described with reference to FIG. 10. FIG. 10 is a flowchart showing the overall operation in the imaging process of the video-content editing assistance system according to this embodiment.

First, when the imaging apparatus 101 is powered on for imaging of an object, the imaging apparatus 101 enters a status in which recording is allowed, that is, the imaging apparatus 101 is set up to allow imaging. Then, by operating the operation unit 416 of the imaging apparatus 101, an imaging date, an imaging time, a date/time-information code, imaging information, etc. are set.

When the setup has been completed and imaging started, in step S901, the mark generator 404 starts detection of a cause for generating electronic mark data. When imaging has been started, in step S902, the mark generator 404 generates electronic mark data relating to a start of recording of content data on the optical disk 104 ("_RecStart").

When the electronic mark data representing "_RecStart" has been generated, in step S903, a date/time-information code generated by the date/time-information code generator 428 at the time when the electronic mark data was generated and the electronic mark data representing "_RecStart" are temporarily stored in the memory 432 or the memory 417.

After the electronic mark data representing "_RecStart" is generated at the start of imaging, the mark generator 404 generates electronic mark data (S902) and stores the electronic mark data (S903) each time a cause for generating electronic mark data is detected (S901).

In step S904, content data that has been captured is recorded on the optical disk 104 from the start of imaging to the end of imaging. As shown in FIG. 10, the procedure from the detection of a cause for generating electronic mark data (S901) to recording of content data (S904) is executed for each take, and an imaging process from a start to an end of a single recording operation of content data is continued until, for example, a stop-recording button (not shown) of the operation unit 416 is pressed. That is, a take loop from the detection of a cause for generating electronic mark data (S901) to recording of content data (S904) is executed until completion of a take.

As an example of a cause for generating electronic mark data by the mark generator 428 (S901), electronic mark data representing "_RecStart" is generated with a start of imaging as a cause. As other examples, electronic mark data representing "_RecEnd" is generated when imaging is ended, and electronic mark data representing "_Flash" or "_OverAudioLimiter" is generated when special video data is detected. Now, a case where electronic mark data representing "_Flash" is generated when special video data is detected as a cause will be described.

Figure 11:
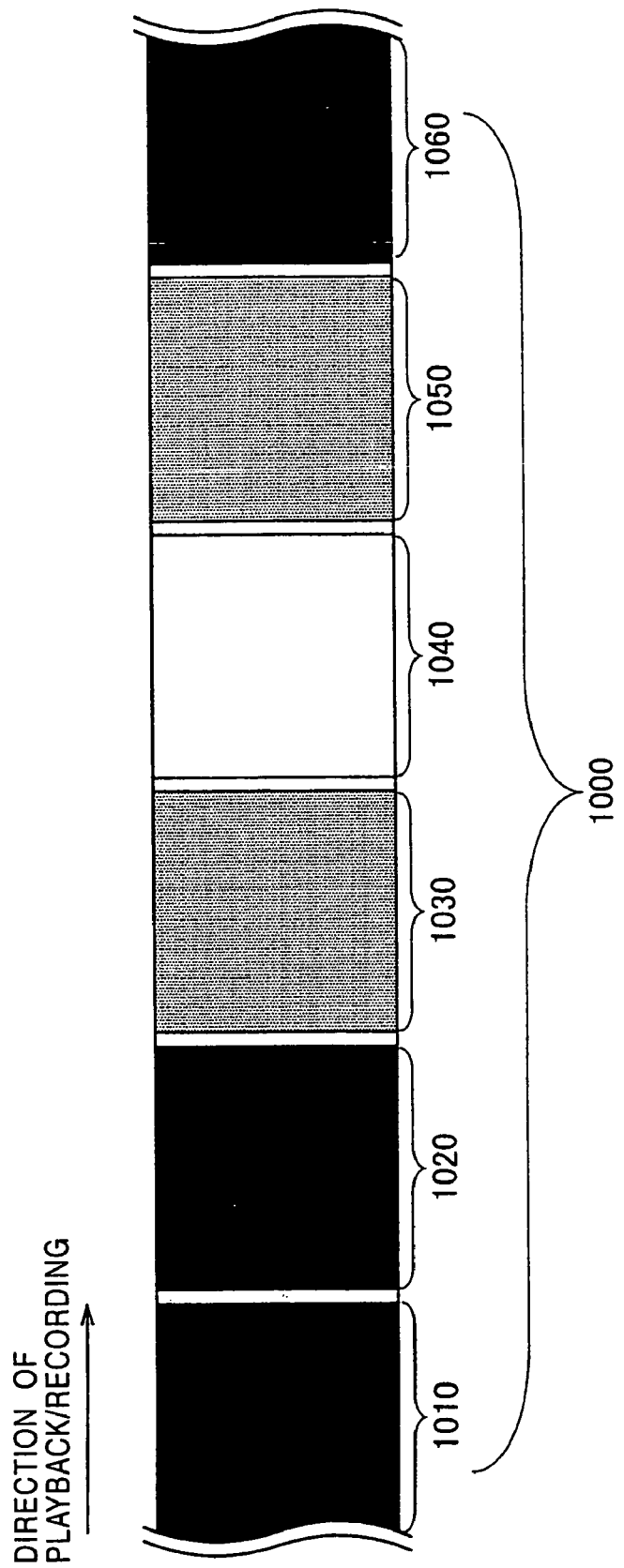
FIG. 11 is a diagram showing the overall structure of flash video data used in the video-content editing assistance system according to the embodiment.

Now, detection of a cause for generating electronic mark data representing "_Flash" will be described with reference to FIG. 11. FIG. 11 is a schematic diagram showing the structure of flash video data used in this embodiment.

As shown in FIG. 11, a cause for generating electronic mark data representing "_Flash" is detected (S901) by detecting flash video data including a scene with flashing of light, which is a type of special video data.

Flash video data 1000 shown in FIG. 11 is content data including at least one frame (frame 1010, frame 1020, ..., and frame 1060). Of the frames 1010 to 1060, the frames 1010, 1020, and 1060 have a smallest total value (or average value) of luminance levels, and the frame 1040 has a largest total value (or average value) of luminance levels.

Since flash video data includes a scene with flashing of light, for example, the flash video data 1000 is detected by calculating the total value (or average value) of the luminance levels of each of the frames 1010 to 1060 and checking whether the total value (or average value) of luminance levels varies among the frames of content data along the direction of playback.

As shown in FIG. 11, the total value (or average value) of luminance levels is substantially constant between the frame 1010 and the frame 1020, but the total value (or average value) of luminance levels increases between the frame 1020 and the frame 1030. This is when flashing starts.

The total value (or average value) of luminance levels further increases between the frame 1030 and the frame 1040. However, with the luminance levels in the frame 1040 as a peak, the total value (or average value) of luminance levels decreases between the frame 1040 and the frame 1050. This is when flashing ends. Since the total value (average value) of luminance levels increases and decreases in a predetermined length period, the mark generator 404 determines that a cause for generating electronic mark data representing "_Flash" has been detected, and generates electronic mark data representing "_Flash".

Similarly, with regard to large-sound-volume audio data, which is also a type of special video data, the mark generator 404 detects an audio output level for each frame, and if the total value (or average value) of audio output levels exceeds a predetermined level within a predetermined length of time, the mark generator 404 determines that a cause for generating "_OverAudioLimiter" has been detected.

Upon completion of imaging for each take (S901 and S902) shown in FIG. 10, the take-metadata generator 405 accesses the memory 432 or the memory 417 to extract electronic mark data generated during the take and a date/time-information code relating to the electronic mark data generated.

In step S905, the take-metadata generator 405 generates, for each take, a take-metadata file such as the one shown in FIG. 4, based on at least the electronic mark data and the date/time-information code extracted and imaging information recorded during imaging.

Figure 12:
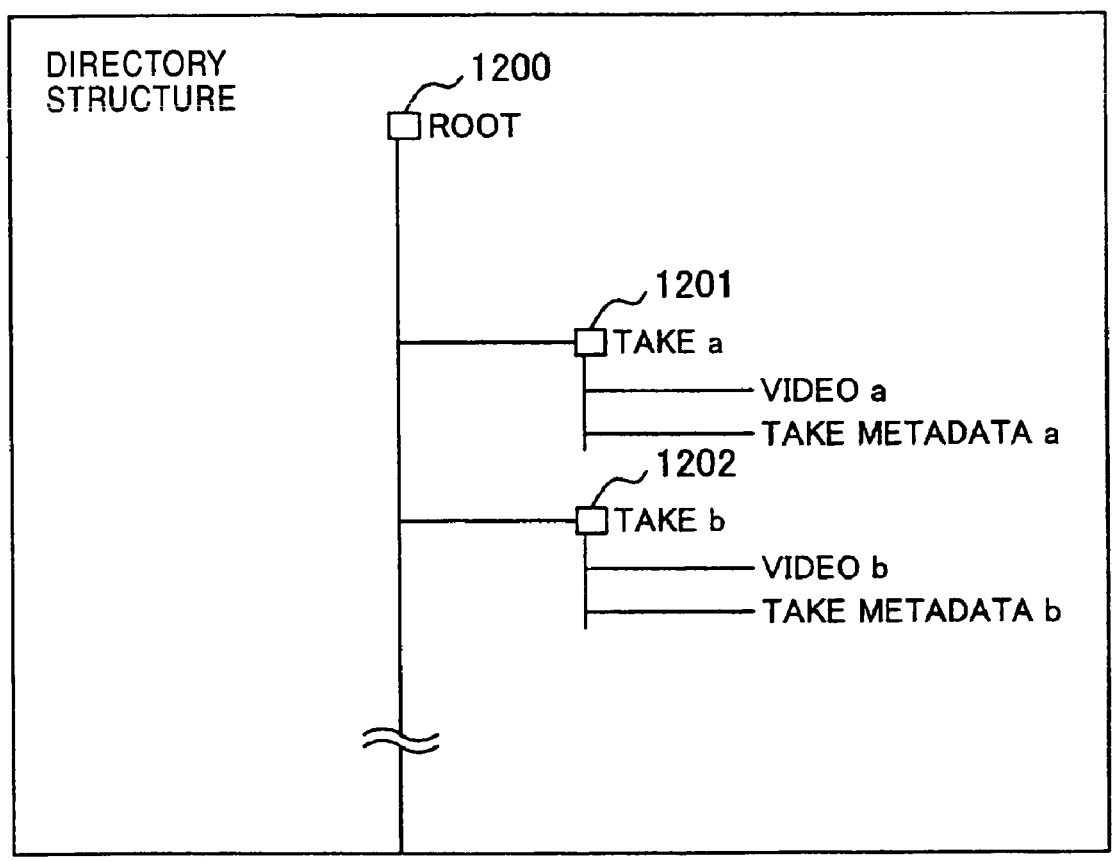
FIG. 12 is a diagram schematically showing the directory structure in an optical disk used in the video-content editing assistance system according to the embodiment.

In step S905, the take-metadata file is recorded on the optical disk 104 by the manager 406. The optical disk 104 having the take-metadata file recorded thereon has a directory structure shown in FIG. 12. FIG. 12 is a schematic diagram showing the directory structure of the optical disk 104 in this embodiment.

As shown in FIG. 12, under a ROOT folder 1200, at least one folder, in this example, a "TAKE a" folder 1201 and a "TAKE b" folder 1202 are provided. Each of the folders includes content data captured in a take and an associated take-metadata file. For example, the folder 1201 includes content data "Video a" and a take-metadata file "TAKE METADATA a", and the folder 1202 includes content data "Video b" and a take-metadata file "TAKE METADATA b".

Thus, content data and a take-metadata file associated therewith are recorded as separate files in the same folder on a take-by-take basis. Although content data and a take-metadata file are recorded as separate files in the same folder in this embodiment, this is not necessary if, for example, content data and a take-metadata file are linked to each other by a UMID or the like. Also, content data and take metadata may be recorded in separate recording regions of the optical disk 104.

Figure 13:
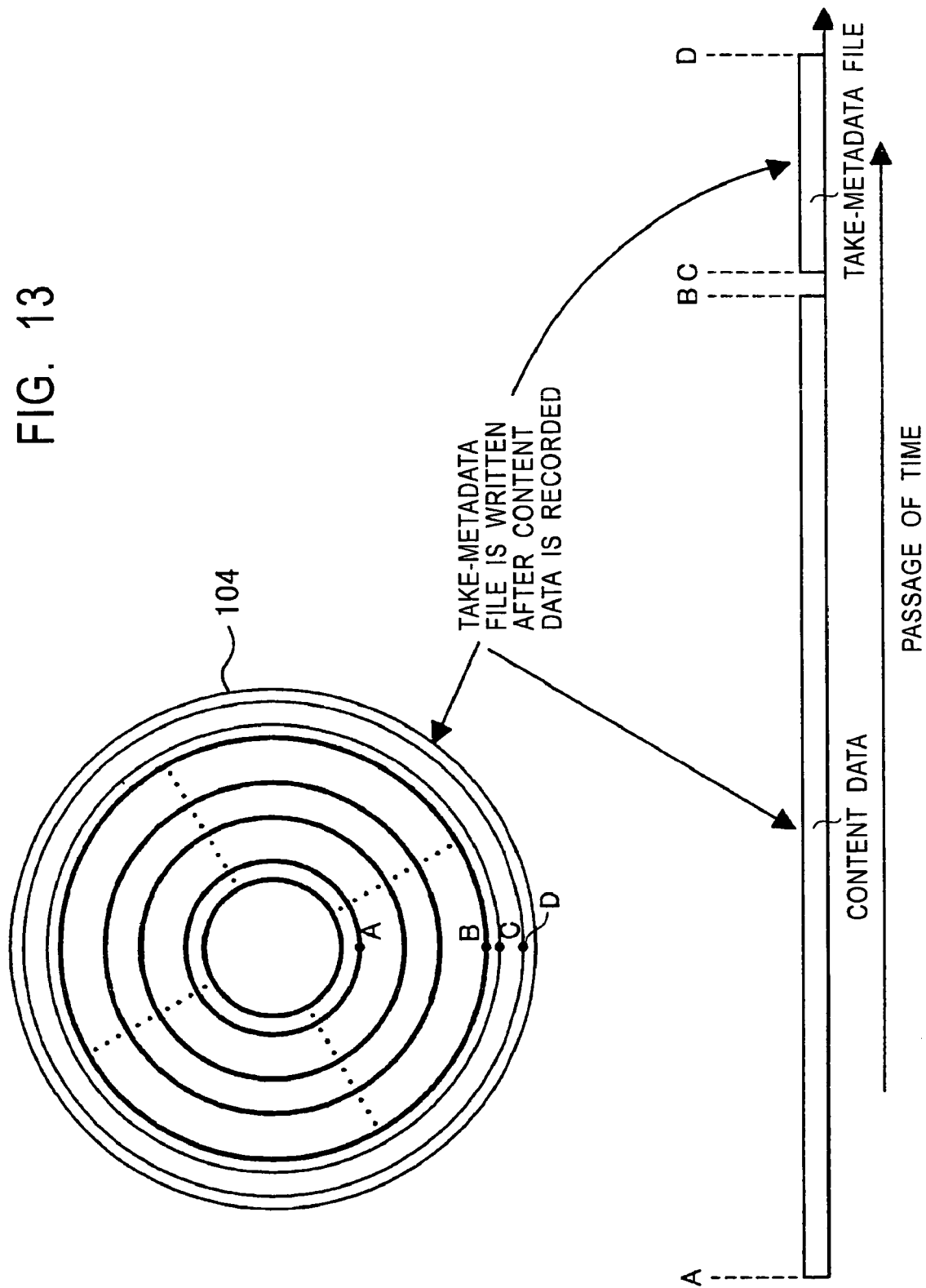
FIG. 13 is a diagram schematically showing the configuration of an optical disk used in the video-content editing assistance system according to the embodiment.

Furthermore, as shown in FIG. 13, the optical disk 104 has a plurality of tracks that serve as recording regions. FIG. 13 is a schematic diagram showing the directory structure in the optical disk 104 in this embodiment. In the process of recording content data on the optical disk 104 (S901), shown in FIG. 10, for example, as shown in FIG. 13, recording of content data is started at a point A, and until completion of an imaging process for a take, content data is sequentially recorded from inside on a plurality of tracks that are arranged substantially concentrically, or actually spirally.

Upon completion of imaging, as shown in FIG. 13, recording of content data on the optical disk 104 ends at a point B. Then, recording of content data is repeated on the remaining recording regions of the optical disk 104 (tracks subsequent to the point B).

The point A denotes where recording of content data captured in a take is started, and the point B denotes where the recording of the content data is ended. Although the recording of content data starts at the point A and ends at the point B in this embodiment, the recording of content data may start and end at other points on the optical disk 104.

Furthermore, upon completion of recording of the content data captured in the take (S904), in the process of recording a take-metadata file (S906), shown in FIG. 10, a take-metadata file is recorded in a recording region from a point C to a point D on the optical disk 104.

The point C denotes where recording of a take-metadata file generated in relation to content data captured in a take is started, and the point D denotes where the recording of the take-metadata file is ended. Although the recording of the take-metadata file starts and ends at the points C and D in this embodiment, the recording of the take-metadata file may start and end at other points on the optical disk 104.

Furthermore, as shown in FIG. 13, although the take-metadata file is recorded in a recording region on the optical disk 104 outer than the recording region where content data is recorded in this embodiment, the take-metadata file may be recorded in a recording region inner than a recording region where the content data is recorded, or the take-metadata file may be recorded starting from a point immediately after or immediately before a track where content data is recorded.

Furthermore, as shown in FIG. 10, although a take-metadata file is generated (S905) and the take-metadata file is recorded (S906) upon completion of recording of content data captured in one take (S904) in this embodiment, alternatively, take-metadata files for all the takes may be generated at one go after completion of recording of content data captured in all the takes and the take-metadata files may be recorded on a take-by-take basis.

As shown in FIG. 13, although the embodiment has been described in the context of an example where recording regions where content data and a take-metadata file are to be recorded are not predetermined, alternatively, for example, a video recording region where content data is to be recorded and a metadata recording region where a take-metadata file is to be recorded may be predetermined on the optical disk 104.

From what has been described above, content data and a take-metadata file are recorded as separate files. Since the optical disk 104 allows random access, it is possible to directly access only a take-metadata file needed and to extract all the electronic mark data included in the take-metadata file. In magnetic tapes or the like, electronic mark data is recorded individually in a region of a frame where content data is recorded, so that it is not allowed to extract all the electronic mark data without playing back content data from beginning to end.

Although content data and a take-metadata file are recorded as separate files on the optical disk 104 in this embodiment, alternatively, for example, content data and a take-metadata file generated for each take may be recorded in separate recording regions of the optical disk 104.

3.2 Editing Process (S802)

Figure 14:
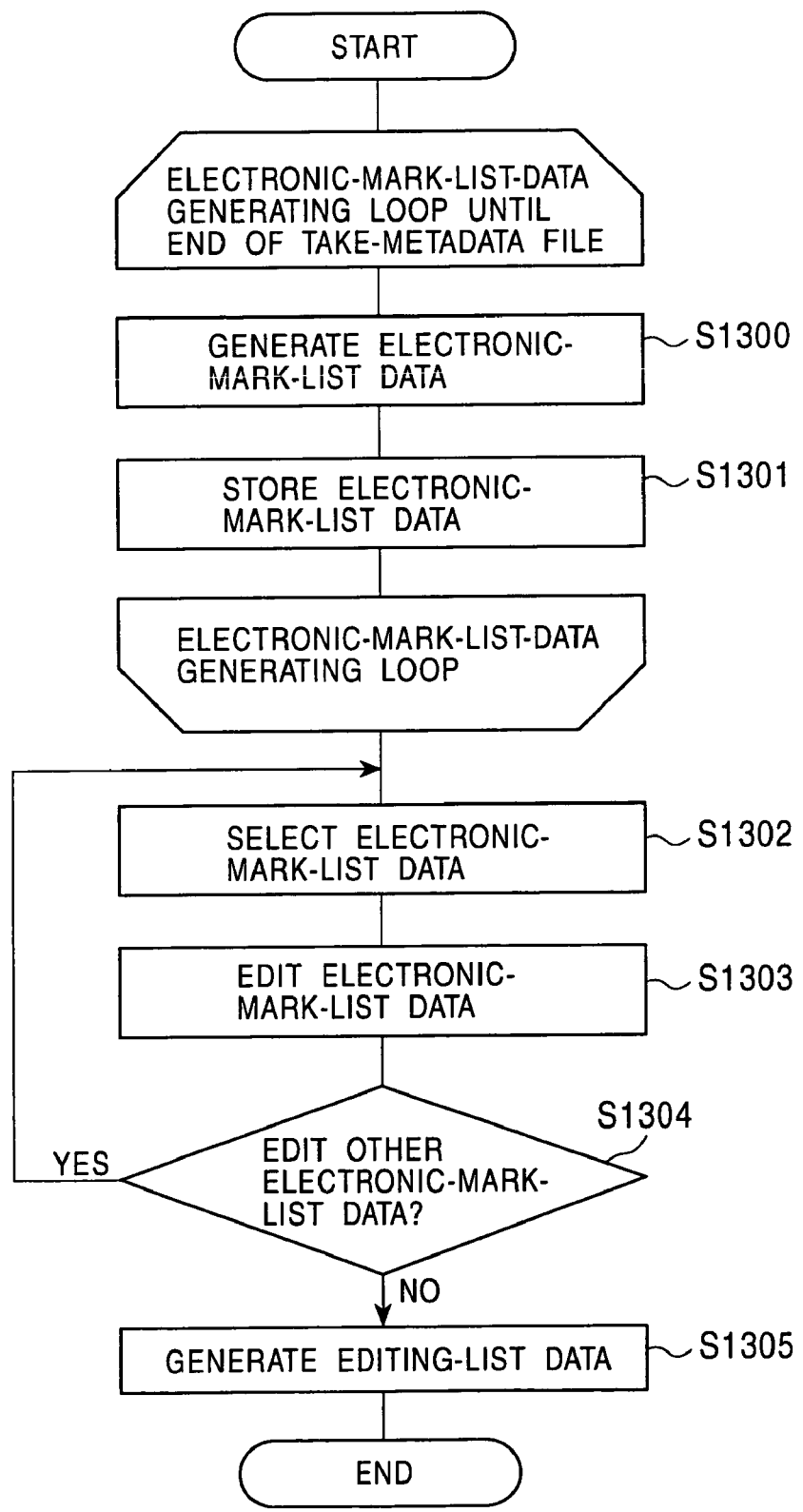
FIG. 14 is a flowchart showing the overall operation in an editing process of the video-content editing assistance system according to the embodiment.

Next, the editing process (S802) will be described with reference to FIG. 14. FIG. 14 is a flowchart showing the overall operation of the editing process in the video-content editing assistance system according to this embodiment.

First, upon completion of imaging in all takes, the optical disk 104 having content data and take-metadata files recorded thereon is loaded on the playback apparatus 102 for coarse editing.

Based on the take-metadata file recorded on the optical disk 104, in step S1300, the playback apparatus 102 generates electronic-mark-list data for coarse editing. Although the embodiment is described in the context of an example where the optical disk 104 is loaded on the playback apparatus 102, without limitation to the example, alternatively, for example, electronic-mark-list data may be generated with the optical disk 104 loaded on the imaging apparatus 101.

The electronic-mark-list data includes at least one set of data including a combination of electronic mark data and a date/time-information code representing a date/time when the electronic mark data was generated, as shown in FIG. 15. FIG. 15 is a schematic diagram showing the structure of electronic-mark-list data before editing, used in this embodiment.

The electronic-mark-list data is written in the XML format, based on take-metadata files. Alternatively, however, the electronic-mark-list data may be written in text format.

In step S1301, the electronic-mark-list data that has been generated is temporarily stored in the memory 517 of the playback apparatus 12. This embodiment has been described in the context of an example where electronic-mark-list data is generated at one go for all the take-metadata files at the time of loading. However, without limitation to the example, alternatively, for example, electronic-mark-list data may be generated as required based on a take-metadata file.

As shown in FIG. 14, an electronic-mark-list-data generating loop including generation of electronic-mark-list data (S1300) and storing of the electronic-mark-list data (S1301) is executed until the end of the take-metadata files.

Upon completion of generation (S1300) and storing (S1301) of electronic-mark-list data for all the take-metadata files, the playback apparatus 102 sends the electronic-mark-list data to the editing apparatus 103 via the network 105. The electronic-mark-list data may be sent via the network 105 based on the SDI. In that case, electronic mark data and date/time-information data of the electronic-mark-list data in text format are KLV-encoded separately and transmitted as included in a V-ancillary section of video data.

Then, in step S1302, the editing apparatus 103 selects electronic-mark-list data needed for final editing from among the electronic-mark-list data generated for each take based on the take-metadata files.

Figure 16:
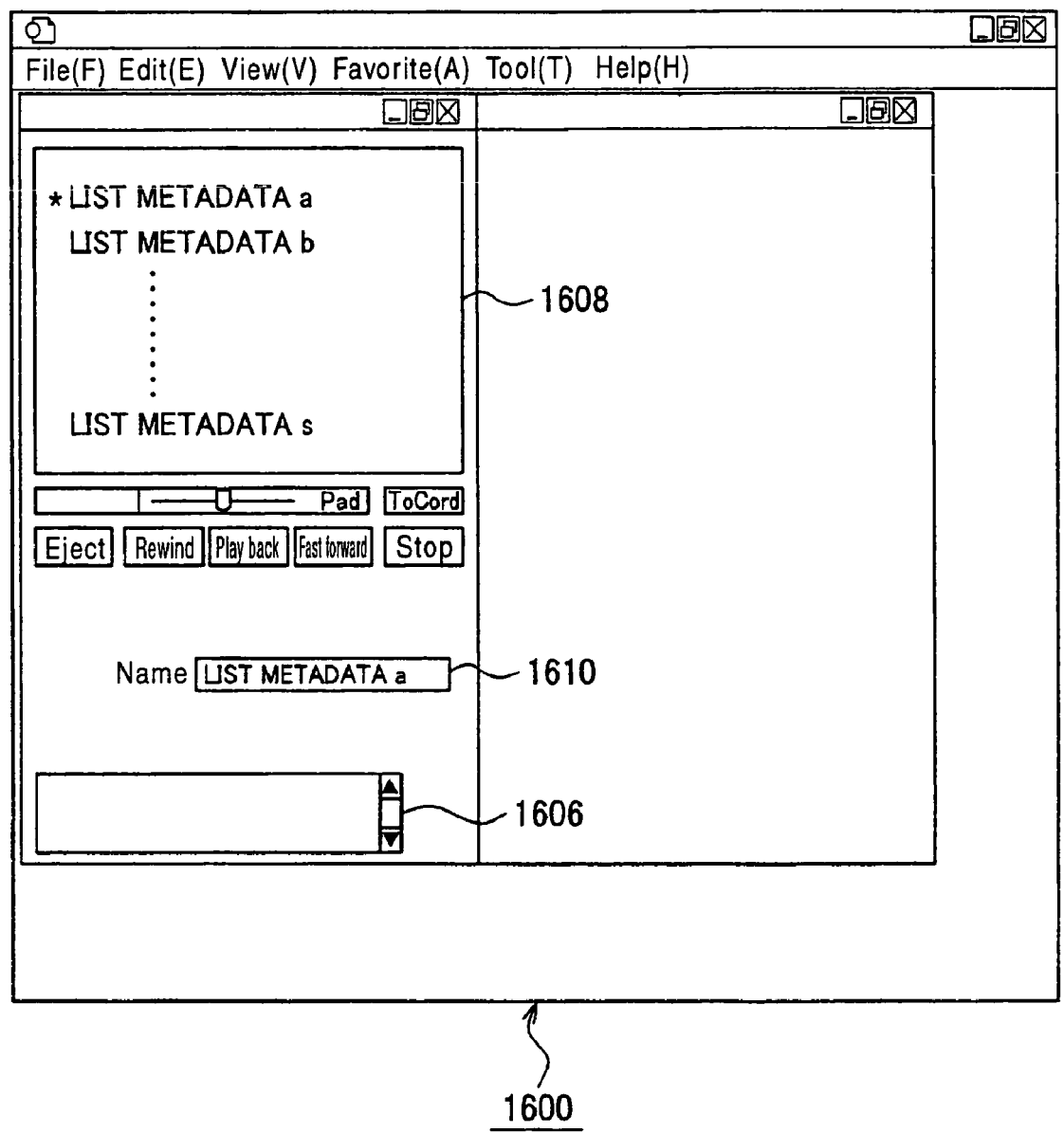
FIG. 16 is a schematic diagram showing an editing screen for editing electronic-mark-list data, used in the video-content editing assistance system according to the embodiment.

Now, selection of electronic-mark-list data in this embodiment will be described with reference to FIG. 16. FIG. 16 is a schematic diagram showing an editing screen for editing electronic-mark-list data, used in this embodiment.

As shown in FIG. 16, an editing screen 1600 for editing electronic-mark-list data is displayed on the LCD 629 of the editing apparatus 103. The editing screen 1600 includes a video display section 1608 where content data, electronic-mark-list data, or electronic mark data is displayed, a message input section 1606 for adding information as needed to electronic-mark-list data, such as comments relating to a video cut, and a display section 1610 where a name of electronic mark data or electronic-mark-list data selected is displayed.

The display section 1610 displays electronic mark data or date/time-information code selected, or a filename of electronic-mark-list data selected, and allows editing of the electronic mark data, the date/time-information code, and the filename of electronic-mark-list data, displayed therein. For example, if electronic mark data selected is "_Flash", editing allows changing to "_OverAudioLimiter". The results of editing is reflected to electronic-mark-list data.

As shown in FIG. 16, the video display section 1608 displays a list of electronic-mark-list data played back by the playback apparatus 102. Furthermore, when the jog dial 703 of the editing-operation unit 612 is operated, an "*" cursor displayed on the left of the electronic-mark-list data moves up and down, allowing selection of electronic-mark-list data (S1302).

Figure 17:
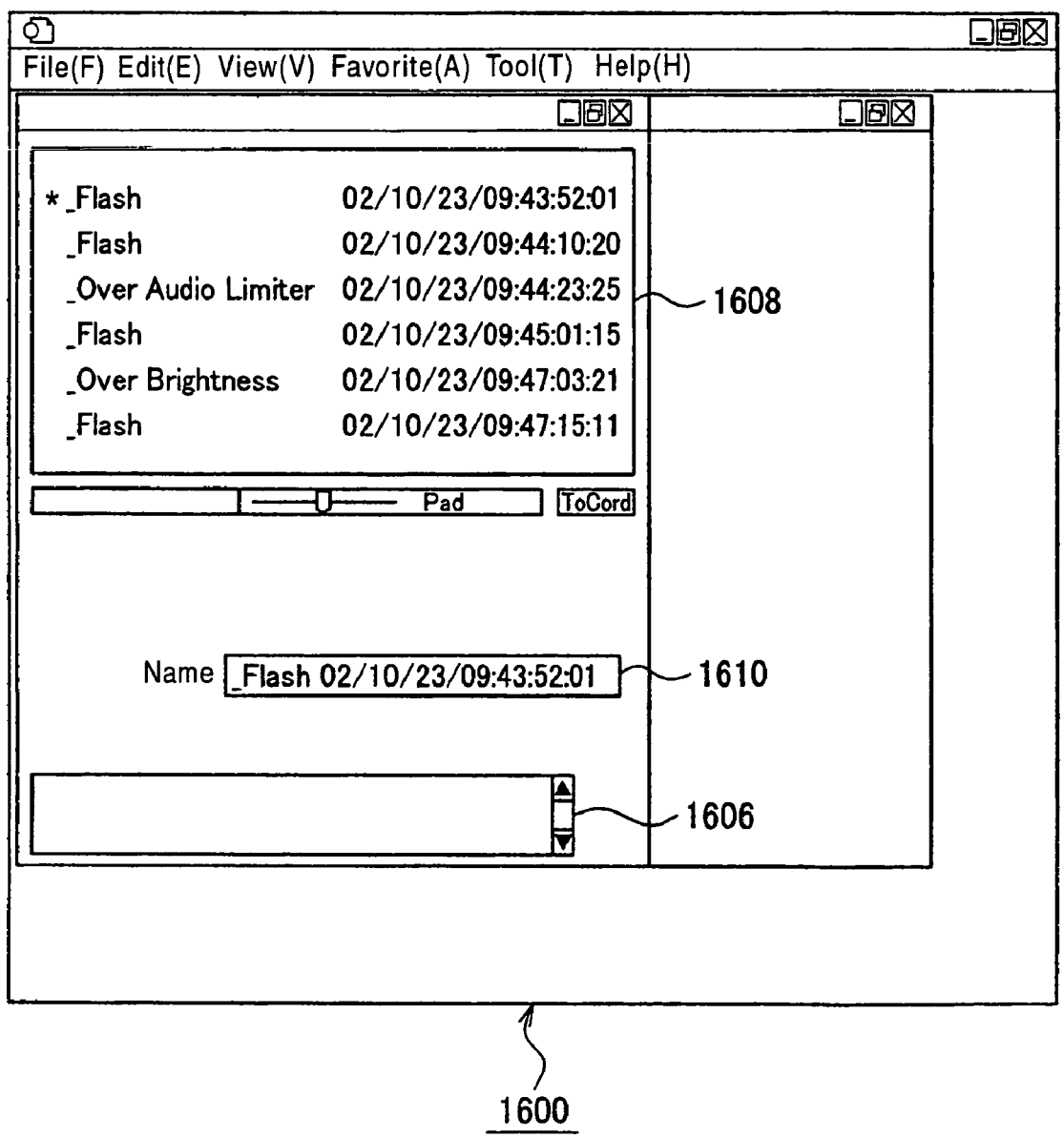
FIG. 17 is a schematic diagram showing an editing screen for editing electronic-mark-list data, used in the video-content editing assistance system according to the embodiment.

When electronic-mark-list data has been selected (S1302) and the mark-display button 701 pressed or otherwise selected, the electronic-mark-list data selected is displayed in the video display section 1608 of the editing screen 1600, as shown in FIG. 17. FIG. 17 is a schematic diagram showing an editing screen for editing electronic-mark-list data, used in this embodiment.

As shown in FIG. 17, at the editing apparatus 103, the jog dial 703 of the editing-operation unit 612 is operated to move the "*" cursor up or down, thereby selecting electronic mark data from the electronic-mark-list data displayed in the video display section 1608.

The electronic mark data serves as an index for extracting a video cut included in a video scene needed for final editing, since it is metadata that serves as an index for processing of content data including a special scene. By considering the electronic mark data, selection of video cuts needed for final editing can be selected.

Figure 18:
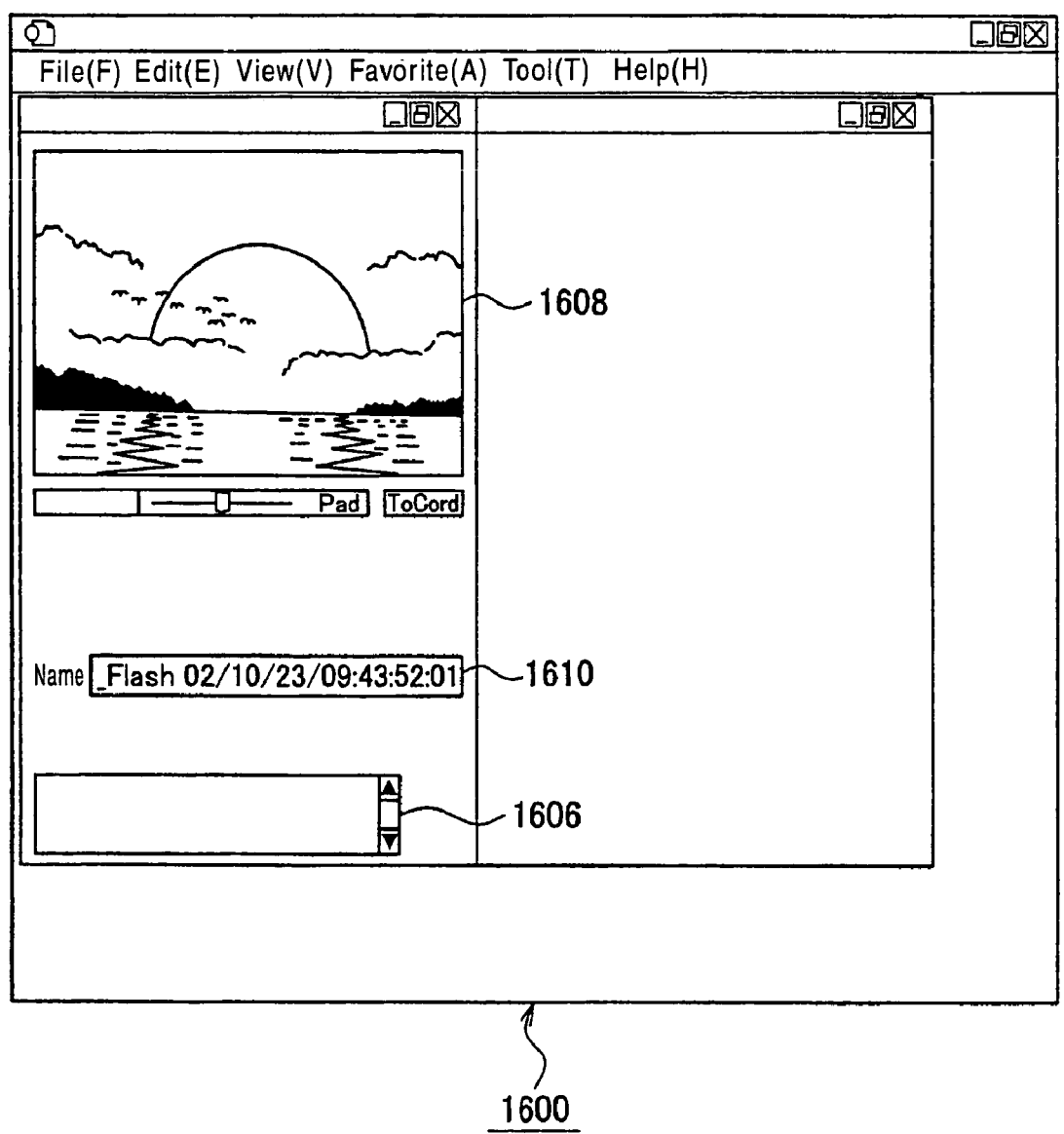
FIG. 18 is a schematic diagram showing an editing screen for editing electronic-mark list-data, used in the video-content editing assistance system according to the embodiment.

When electronic mark data has been selected by operating the jog dial 703 and the video-display button 702 pressed or otherwise selected, the playback apparatus 102 sends content data to the editing apparatus 103 via the network 105 based on the SDI. Then, as shown in FIG. 18, the content data is played back in the video display section 1608, starting from a point specified by a date/time-information code relating to the electronic mark data selected. FIG. 18 is a schematic diagram showing an editing screen for editing electronic-mark-list data, used in this embodiment. In the video display section 1608 shown in FIG. 18, electronic-mark-list data is not displayed when content data is played back. However, without limitation to the example, alternatively, for example, content data may be displayed on a background of electronic-mark-list data.

The embodiment has been described in the context of an example where content data played back in the video display section 1608 has a high resolution and is not compressed. However, without limitation to the example, alternatively, for example, the playback apparatus 102 may generate low-resolution content data compressed based on, for example, Motion JPEG, MPEG1, or MPEG2, sending the compressed content data to the editing apparatus 103. In that case, the playback apparatus 102 may compress all the content data recorded on the optical disk 104 and send the resulting low-resolution content data to the editing apparatus 103, or compress only a portion that is to be played back by the editing apparatus 103 and send the resulting low-resolution content data to the editing apparatus 103.

In order to define a range of a video cut needed for final editing from content data displayed in the video-display section 1608 shown in FIG. 18, in step S1303, the editing apparatus 103 edits electronic-mark-list data; for example, it sets an In-point and an Out-point based on as specified using the In-point specifying button 704 and the Out-point specifying button 705 of the editing-operation unit 612.

In the editing of electronic-mark-list data (S1303), for example, in order to specify an In-point and an Out-point, first, the jog dial 703 is rotated to go to a suitable point of content data.

Then, by pressing the In-point specifying button 704 and the Out-point specifying button 705, an In-point and an Out-point are specified based on date/time-information codes recorded in current frames of content data, respectively.

When an In-point and an Out-point have been specified, the editor 613 adds electronic mark data "_In-001" representing an In-point (extraction start point) and a date/time-information code and electronic mark data "_Out-001" representing an Out-point (extraction end point) and a date/time-information code to the electronic-mark-list data. FIG. 19 is a schematic diagram showing the structure of electronic-mark-list data after editing in this embodiment.

As shown in FIG. 19 "_In-001" and "_Out-001" in this embodiment denote an In-point and Out-point that are generated first, respectively. The number is sequentially incremented each time an In-point and an Out-point are generated. That is, an In-point and an Out-point that are generated secondly are denoted by "_In-002" and "_Out-002".

Figure 20:
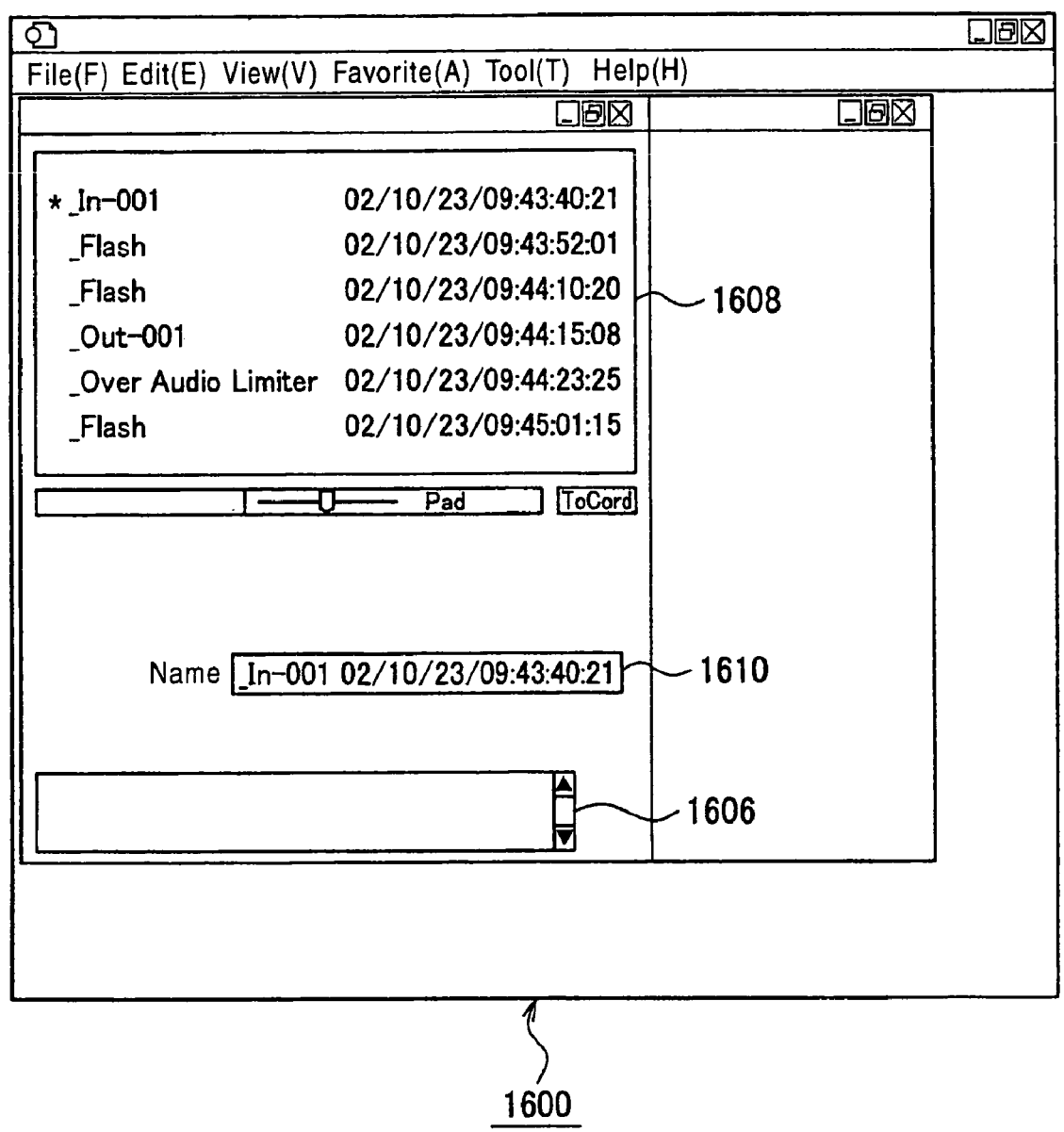
FIG. 20 is a schematic diagram showing an editing screen for editing electronic-mark-list data, used in the video-content editing assistance system according to the embodiment.

When the mark-display button 701 of the editing-operation unit 612 is again pressed or otherwise selected, electronic-mark-list data having been edited is displayed in the video-display section 1608, as shown in FIG. 20. As shown in FIG. 19, electronic mark data representing "_In-001" and "_Out-001" are added at the end by the editing of electronic-mark-list data (S1303). However, in the video-display section 1608, since electronic mark data is sorted in ascending order by date/time-information code, "_In-001" is displayed at the top. FIG. 20 is a schematic diagram of an editing screen for editing electronic-mark-list data, used in this embodiment.

When electronic mark data representing "_In-001" specifying an In-point in the electronic-mark-list data is selected using the jog dial 703 and the video-display button 702 pressed, content data is played back in the video-display section 1608 up to "_Out-001" having the same number as "_In-001". Thus, a video cut needed for final editing can be checked.

When editing of electronic-marl-list data has been completed, if it is determined in step S1304 that other electronic-mark-list data is to be edited, a list of electronic-mark-list data shown in FIG. 16 is displayed in the video-display section 1608. Then, electronic-mark-list data is selected (S1302) and, the electronic-mark-list data is edited (S1303) as described above.

If it is determined in step S1304 that other electronic-mark-list data need not be edited, in step S1305, the editor 613 generates editing-list data that is to be used in final editing. In this embodiment, the editing-list data includes an In-point and an Out-point set to content data, and an order of playing back video cuts selected. Although coarse editing in this embodiment includes steps S1300 to S1305 as shown in FIG. 14, coarse editing is not limited to the example.

Furthermore, although the editing-list data in this embodiment is in the EDL (Edit Decision List) format, without limitation to the example, the editing-list data may be in other formats.

When the editing-list data has been generated, the imaging process (S802) ends, whereby coarse editing before final editing completes. Then, final editing is carried out based on the editing-list data and content data recorded on the optical disk 104, whereby a perfect package of content data is produced.

Although preferred embodiments of the present invention have been described with reference to the accompanying drawings, the present invention is not limited to the embodiments. It is to be understood that various modifications and alternatives can be anticipated by those skilled in the art without departing from the sprit of the present invention as defined by the Claims, which obviously fall in the scope of the present invention.

Although the embodiments have been described in the context of an example where the optical disk 104 is used as a recording medium, the present invention is not limited to the example. Alternatively, for example, a magnetic disk or a semiconductor solid-state memory may be used as a recording medium.

What is claimed is:

1. A content editing assistance system comprising:
  a mark generator for generating electronic mark data relating to content data;
  a take-metadata generator for generating a take-metadata file based on the electronic mark data generated for each take;
  a manager for managing the content data and the take-metadata file relating to the content data as separate files;
  a list generator for generating electronic-mark-list data based on the take-metadata file; and
  an editor for editing the electronic-mark-list data,
  wherein the electronic mark indicating a special content data is generated when the mark generator detects a peak of total value of luminance levels of each frame in a predetermined length period, or when the mark generator detects that total value of audio output levels of each frame exceeds a predetermined level within a predetermined length period.

2. A video processing apparatus comprising:
a mark generator for generating electronic mark data relating to content data;
a take-metadata generator for generating a take-metadata file for each take, based on the electronic mark data; and
a manager for managing the content data and the take-metadata file relating to the content data as separate files,
wherein the electronic mark indicating a special content data is generated when the mark generator detects a peak of total value of luminance levels of each frame in a predetermined length period, or when the mark generator detects that total value of audio output levels of each frame exceeds a predetermined level within a predetermined length period.

3. A video processing apparatus according to claim 2, wherein the content data and the electronic mark data included in the take-metadata file are associated with each other by a time-information code that allows the content data to be identified on a frame basis.

4. A video processing apparatus according to claim 2, wherein the manager records the content data and the take-metadata file on a recording medium as separate files.

5. A video processing apparatus according to claim 2, wherein the take corresponds to an imaging process that is continued from a start to an end of a single recording operation.

6. A video processing apparatus according to claim 2, wherein the special content data includes flash video data captured with flashing of light when the mark generator detects a peak of total value of luminance levels of each frame in a predetermined length period.

7. A video processing apparatus according to claim 2, wherein the special content data includes large-sound-volume audio data when the mark generator detects that total value of audio output levels of each frame exceeds a predetermined level within a predetermined length period.

8. A video processing apparatus according to claim 2, wherein the take-metadata file includes the electronic mark data and a time-information code.

9. A video processing apparatus according to claim 2, wherein the manager records the content data captured in each take and the take-metadata file relating to the content data together on a recording medium.

10. A video processing apparatus according to claim 2, wherein the manager records the take-metadata file relating to the content data in a region of a recording medium, the region being separate from a region where the content data captured in each take is recorded.

11. A video processing apparatus according to claim 2, further comprising an imager for capturing the content data.

12. A video processing apparatus according to claim 2, wherein the electronic mark data includes an index of the content data.

13. A playback apparatus for playing back content data, comprising:
a player for playing back data recorded on a recording medium; and
a list generator for generating electronic-mark-list data based on a take-metadata file generated for each take and recorded on the recording medium together with the content data,
wherein the electronic mark indicating a special content data is generated when the mark generator detects a peak of total value of luminance levels of each frame in a predetermined length period, or when the mark generator detects that total value of audio output levels of each frame exceeds a predetermined level within a predetermined length period.

14. A playback apparatus according to claim 13, wherein the take corresponds to an imaging process that is continued from a start to an end of a single recording operation.

15. An editing apparatus comprising:
an editor for editing electronic-mark-list data that is generated based on a take-metadata file generated for each take and recorded on a recording medium; and
a display controller for displaying the electronic-mark-list data,
wherein the electronic mark indicating a special content data is generated when the mark generator detects a peak of total value of luminance levels of each frame in a predetermined length period, or when the mark generator detects that total value of audio output levels of each frame exceeds a predetermined level within a predetermined length period.

16. An editing apparatus according to claim 15, wherein the take corresponds to an imaging process that is continued from a start to an end of a single recording operation.

17. An editing apparatus according to claim 15, wherein the take-metadata file includes the electronic mark data relating to the content data and a time-information code.

18. An editing apparatus according to claim 15, wherein the editor generates editing-list data for editing content data, based on the electronic-mark-list data having been edited.

19. An editing apparatus according to claim 15, wherein the editor adds electronic mark data to the electronic-mark-list data.

20. A content processing method comprising the steps of:
generating electronic mark data relating to content data, utilizing a mark generator;
generating a take-metadata file based on the electronic mark data generated for each take, utilizing a take-metadata generator;
managing the content data and the take-metadata file relating to the content data as separate files, utilizing a manager unit;
wherein the electronic mark indicating a special content data is generated when the mark generator detects a peak of total value of luminance levels of each frame in a predetermined length period, or when the mark generator detects that total value of audio output levels of each frame exceeds a predetermined level within a predetermined length period.

21. A content processing method according to claim 20, wherein the content data and the electronic mark data included in the take-metadata file are associated with each other by a time-information code that allows the content data to be identified on a frame basis.

22. A content processing method according to claim 20, wherein the content data and the take-metadata file are recorded and managed on a recording medium as separate files.

23. A content processing method according to claim 20, wherein the take corresponds to an imaging process that is continued from a start to an end of a single recording operation.

24. A content processing method according to claim 20, wherein the special content data includes flash video data captured with flashing of light when the mark generator detects a peak of total value of luminance levels of each frame in a predetermined length period.

25. A content processing method according to claim 20, wherein the special content data includes large-sound-volume audio data when the mark generator detects that total value of audio output levels of each frame exceeds a predetermined level within a predetermined length period.

26. A content processing method according to claim 20, wherein the take-metadata file includes the electronic mark data and a time-information code.

27. A content processing method according to claim 20, wherein the content data captured in each take and the take-metadata file relating to the content data are recorded together on a recording medium.

28. A content processing method according to claim 20, wherein the take-metadata file relating to the content data is recorded in a region of a recording medium, the region being separate from a region where the content data captured in each take is recorded.

29. A content processing method according to claim 20, wherein the electronic mark data includes an index of the content data.

30. A content processing method comprising the steps of:
reading a take-metadata file generated for each take and recorded on a recording medium together with content data, utilizing a player; and
generating electronic-mark-list data based on the take-metadata file, utilizing a list generator,
wherein the electronic mark indicating a special content data is generated when the mark generator detects a peak of total value of luminance levels of each frame in a predetermined length period, or when the mark generator detects that total value of audio output levels of each frame exceeds a predetermined level within a predetermined length period.

31. A computer readable medium for storing a computer program to execute a content processing method comprising the steps of:
generating electronic mark data relating to content data;
generating a take-metadata file based on the electronic mark data generated for each take; and
managing the content data and the take-metadata file relating to the content data as separate files,
wherein the electronic mark indicating a special content data is generated when the mark generator detects a peak of total value of luminance levels of each frame in a predetermined length period, or when the mark generator detects that total value of audio output levels of each frame exceeds a predetermined level within a predetermined length period.

32. A non-transitory computer readable medium for storing a computer program to execute a content processing method comprising the steps of: reading a take-metadata file generated for each take and recorded on a recording medium together with content data; and generating electronic-mark-list data based on the take-metadata file, wherein the electronic mark indicating a special content data is generated when the mark generator detects a peak of total value of luminance levels of each frame in a predetermined length period, or when the mark generator detects that total value of audio output levels of each frame exceeds a predetermined level within a predetermined length period.

* * * * *